United States Patent
Nakamura et al.

(10) Patent No.: US 9,977,524 B2
(45) Date of Patent: May 22, 2018

(54) FLEXIBLE TOUCH PANEL INCLUDING A BONDING LAYER

(71) Applicant: Semiconductor Energy Laboratory Co., Ltd., Kanagawa-ken (JP)

(72) Inventors: Daiki Nakamura, Kanagawa (JP); Hisao Ikeda, Kanagawa (JP)

(73) Assignee: Semiconductor Energy Laboratory Co., Ltd. (JP)

(*) Notice: Subject to any disclaimer, the term of this patent is extended or adjusted under 35 U.S.C. 154(b) by 257 days.

(21) Appl. No.: 14/643,166

(22) Filed: Mar. 10, 2015

(65) Prior Publication Data

US 2015/0261332 A1    Sep. 17, 2015

(30) Foreign Application Priority Data

Mar. 13, 2014 (JP) .................. 2014-050670

(51) Int. Cl.
    *G06F 3/041*     (2006.01)
    *G06F 3/044*     (2006.01)

(52) U.S. Cl.
    CPC ............ *G06F 3/0412* (2013.01); *G06F 3/044* (2013.01); *G06F 2203/04102* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 5,821,138 A | 10/1998 | Yamazaki et al. | |
| 6,846,696 B2 | 1/2005 | Adachi et al. | |
| 6,946,361 B2 | 9/2005 | Takayama et al. | |
| 7,056,810 B2 | 6/2006 | Yamazaki et al. | |
| 7,180,091 B2 | 2/2007 | Yamazaki et al. | |
| 7,189,631 B2 | 3/2007 | Yamazaki et al. | |
| 7,282,380 B2 | 10/2007 | Maruyama et al. | |
| 7,335,573 B2 | 2/2008 | Takayama et al. | |
| 7,351,300 B2 | 4/2008 | Takayama et al. | |
| 7,521,383 B2 | 4/2009 | Morisue et al. | |
| 7,867,907 B2 | 1/2011 | Shimomura et al. | |
| 8,030,132 B2 | 10/2011 | Ogita et al. | |
| 8,110,442 B2 | 2/2012 | Jinbo | |
| 8,367,440 B2 | 2/2013 | Takayama et al. | |
| 8,415,208 B2 | 4/2013 | Takayama et al. | |
| 2003/0032210 A1 | 2/2003 | Takayama et al. | |
| 2013/0234734 A1* | 9/2013 | Iida .................. | G06F 3/044 324/661 |
| 2014/0238152 A1* | 8/2014 | Kallassi ............ | G01R 27/2605 73/862.626 |
| 2014/0327654 A1* | 11/2014 | Sugita ............... | G06F 3/044 345/174 |

(Continued)

FOREIGN PATENT DOCUMENTS

JP      2003-174153      6/2003

*Primary Examiner* — Joseph Haley
*Assistant Examiner* — Emily Frank
(74) *Attorney, Agent, or Firm* — Husch Blackwell LLP

(57) ABSTRACT

A flexible touch panel that achieves both thinness and high detection sensitivity. In the flexible touch panel obtained by attaching a flexible display panel and a flexible touch sensor with a bonding layer, the bonding layer has a Young's modulus of 1 kPa to 300 kPa, a thickness of 0.1 mm to 1 mm, and a transmittance of 70% or more.

21 Claims, 19 Drawing Sheets

(56) References Cited

U.S. PATENT DOCUMENTS

2015/0200375 A1* 7/2015 Kim .................. H01L 27/323
                                                                                          257/40
2016/0231098 A1* 8/2016 Otaka .................. G06F 3/044
2016/0253031 A1* 9/2016 Cotton ................. G06F 3/044

* cited by examiner

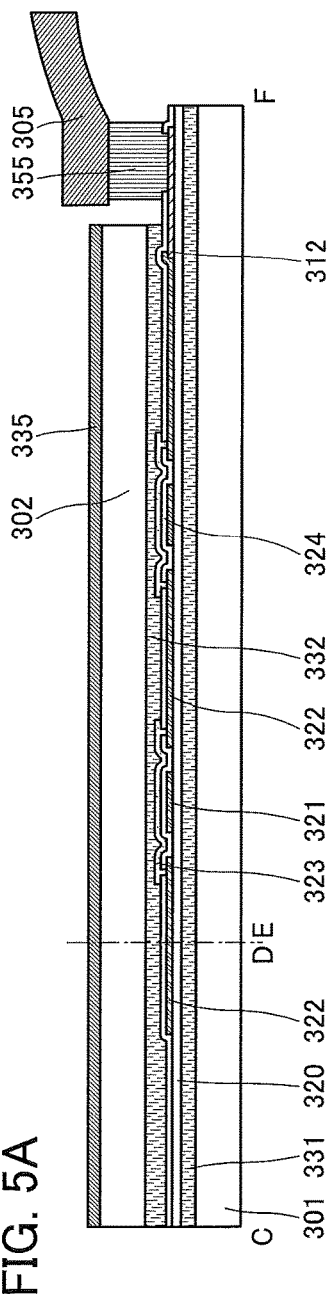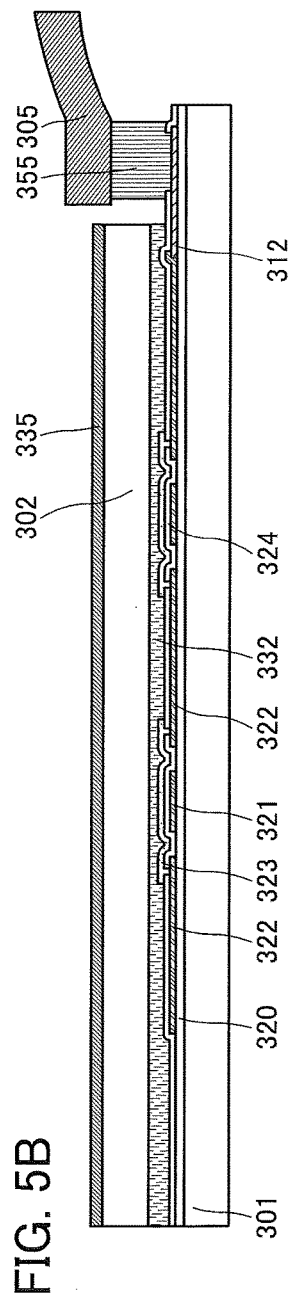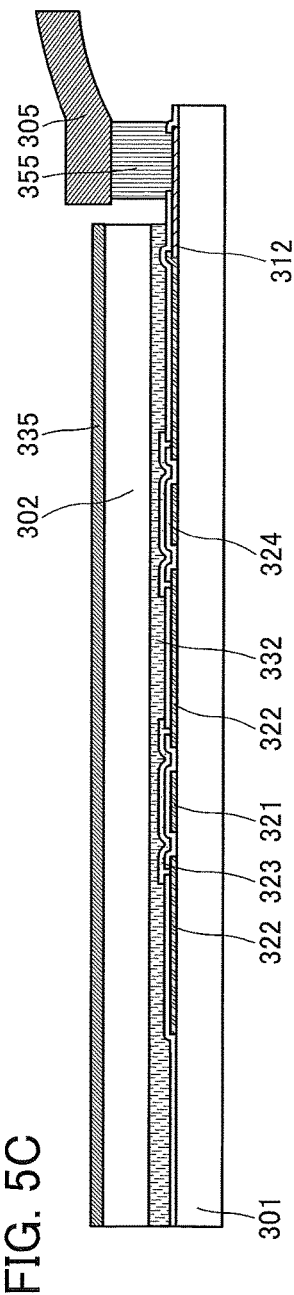

FIG. 18A
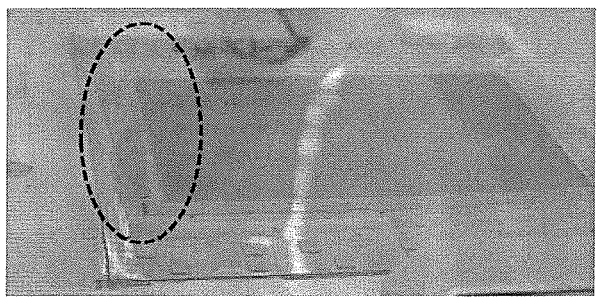
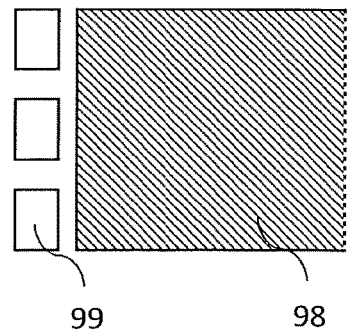
99    98
FIG. 18B
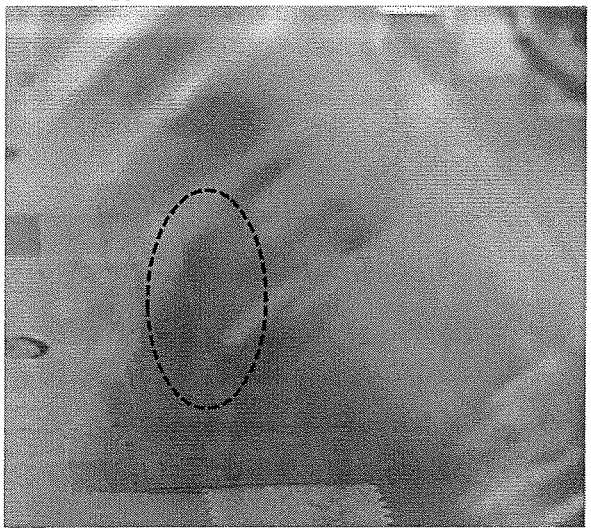
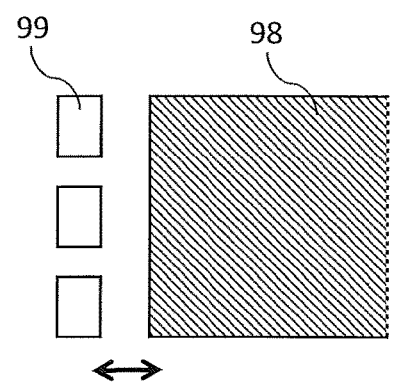
99    98
↔
FIG. 18C
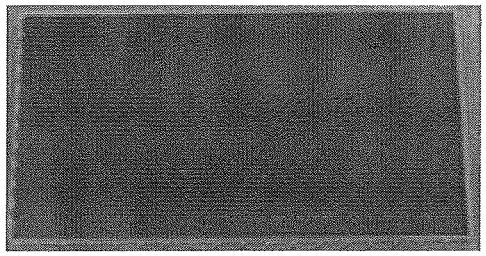
FIG. 18E
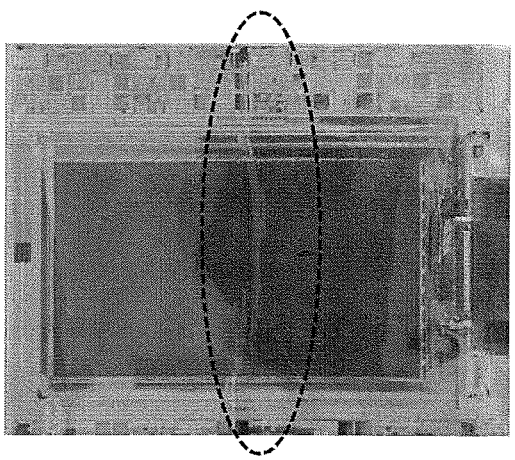
FIG. 18D
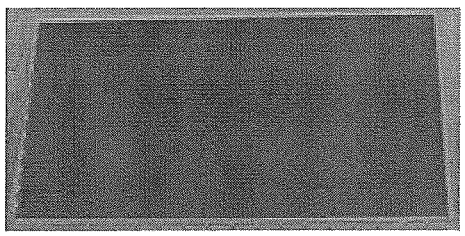

FLEXIBLE TOUCH PANEL INCLUDING A BONDING LAYER

BACKGROUND OF THE INVENTION

1. Field of the Invention

One embodiment of the present invention relates to a touch panel, and particularly to a flexible touch panel.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the invention disclosed in this specification include a semiconductor device, a display device, a light-emitting device, a power storage device, a memory device, an electronic device, a lighting device, a method for driving any of them, and a method for manufacturing any of them.

2. Description of the Related Art

In recent years, a flexible device in which a functional element such as a semiconductor element, a display element, or a light-emitting element is provided over a substrate having flexibility (hereinafter also referred to as flexible substrate) has been developed. Typical examples of the flexible device include a lighting device, an image display device, and a variety of semiconductor circuits including a semiconductor element such as a transistor.

Patent Document 1 discloses a flexible active matrix light-emitting device in which an organic electroluminescent (EL) element and a transistor serving as a switching element are provided over a film substrate.

Recent display devices are expected to be applied to a variety of uses and become diversified. For example, a smartphone and a tablet with a touch panel are being developed as portable information appliances.

REFERENCE

Patent Document 1: Japanese Published Patent Application No. 2003-174153

SUMMARY OF THE INVENTION

What is desirable is a flexible touch panel in which a flexible display panel is provided with a function of inputting data with a finger or the like touching a screen as a user interface.

An object of one embodiment of the present invention is to provide a flexible touch panel. Another object of one embodiment of the present invention is to provide a lightweight touch panel. Another object of one embodiment of the present invention is to provide a thin touch panel. Another object of one embodiment of the present invention is to provide a touch panel with high detection sensitivity. Another object of one embodiment of the present invention is to provide a touch panel with high reliability. Another object of one embodiment of the present invention is to provide a touch panel highly resistant to repeated bending. Another object of one embodiment of the present invention is to achieve both a reduction in thickness and high detection sensitivity of a touch panel.

Another object of one embodiment of the present invention is to provide a touch panel that has high resistance to repeated bending and high detection sensitivity. Another object of one embodiment of the present invention is to provide a thin touch panel that has high resistance to repeated bending and high detection sensitivity.

Another object of one embodiment of the present invention is to provide a novel semiconductor device, a novel light-emitting device, a novel display device, a novel touch sensor, a novel touch panel, a novel electronic device, or a novel lighting device.

Note that the description of these objects does not disturb the existence of other objects. In one embodiment of the present invention, there is no need to achieve all the objects. Other objects will be apparent from and can be derived from the description of the specification, the drawings, the claims, and the like.

One embodiment of the present invention is a flexible touch panel including a display panel, a touch sensor, and a bonding layer. The display panel is flexible. The touch sensor is flexible. The bonding layer is between the display panel and the touch sensor. The bonding layer includes a first portion, a second portion, and a third portion. The first portion has a Young's modulus greater than or equal to 1 kPa and less than or equal to 300 kPa. The second portion has a thickness greater than or equal to 0.1 mm and less than or equal to 1 mm. The third portion has a transmittance of 70% or more.

In the above structure, the touch sensor is preferably a capacitive touch sensor.

In each of the above structures, the display panel preferably includes an organic EL element.

In each of the above structures, the first portion preferably has a Young's modulus greater than or equal to 1 kPa and less than or equal to 100 kPa.

In each of the above structures, the second portion preferably has a thickness greater than or equal to 0.1 mm and less than or equal to 0.5 mm.

In each of the above structures, the third portion preferably has a transmittance of 90% or more.

In each of the above structures, the bonding layer preferably includes a fourth portion with a compression set of 50% or less.

In each of the above structures, the bonding layer preferably includes a fifth portion with a penetration of greater than 75, preferably 100 or greater.

In each of the above structures, the bonding layer may be a gel.

Note that a light-emitting device in this specification includes a display device using a light-emitting element in its category. A light-emitting device may be included in a module in which a light-emitting element is provided with a connector such as an anisotropic conductive film or a tape carrier package (TCP); a module in which a printed wiring board is provided at the end of a TCP; or a module in which an integrated circuit (IC) is directly mounted on a light-emitting element by a chip on glass (COG) method. A light-emitting device may be included in a lighting device or the like.

One embodiment of the present invention can provide any of the following: a flexible touch panel, a lightweight touch panel, a thin touch panel, a touch panel with high detection sensitivity, a touch panel with high reliability, and a touch panel highly resistant to repeated bending. Another embodiment of the present invention can achieve both a reduction in thickness and high detection sensitivity of a touch panel.

Another embodiment of the present invention can provide a touch panel that has high resistance to repeated bending and high detection sensitivity. Another embodiment of the present invention can provide a thin touch panel that has high resistance to repeated bending and high detection sensitivity.

Another embodiment of the present invention can provide a novel semiconductor device, a novel light-emitting device, a novel display device, a novel touch sensor, a novel touch panel, a novel electronic device, or a novel lighting device.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIGS. 5A to 5C illustrate examples of a touch sensor of one embodiment of the present invention;

FIGS. 18A to 18E are photographs and diagrams showing results in Example; and

DETAILED DESCRIPTION OF THE INVENTION

Figure 1A:
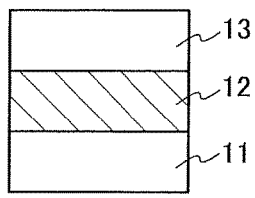
FIGS. 1A to 1F illustrate examples of a touch panel of one embodiment of the present invention.

Embodiments will be described in detail with reference to the drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. In some cases, the same hatching pattern is used for portions having similar functions, and the portions are not denoted by reference numerals.

The position, size, range, or the like of each structure illustrated in drawings and the like is not accurately represented in some cases for easy understanding. Therefore, the disclosed invention is not necessarily limited to the position, size, range, or the like disclosed in the drawings and the like.

Embodiment 1

In this embodiment, a touch panel of one embodiment of the present invention will be described.

The touch panel of one embodiment of the present invention is a flexible touch panel including a display panel, a touch sensor, and a bonding layer. The display panel and the touch sensor are flexible. The bonding layer is placed between the display panel and the touch sensor. The Young's modulus of the bonding layer ranges from 1 kPa to 300 kPa.

Parasitic capacitance is sometimes generated between a wiring or an electrode included in a capacitive touch sensor and a wiring or an electrode included in a display panel. The parasitic capacitance might cause a small capacitance change when a finger or the like approaches the touch sensor, resulting in a decrease in the detection sensitivity of the touch sensor. The detection sensitivity of the touch sensor might be decreased also when noise generated while the display panel operates travels to the touch sensor through the parasitic capacitance. Thus, it is preferred that the distance between the touch sensor and the display panel be sufficiently large.

Meanwhile, if a bonding layer for attaching the touch sensor and the display panel is thick, the touch panel may become difficult to bend or the bonding layer may be peeled off or broken by a crack caused therein by bending.

In view of the above, in the touch panel of one embodiment of the present invention, the Young's modulus of the bonding layer for attaching the touch sensor and the display panel is 1 kPa or more and less than 300 kPa. Thus, a touch panel that is highly resistant to repeated bending is obtained even with a thick bonding layer. Consequently, a decrease in the detection sensitivity of a capacitive touch sensor can be prevented.

In the touch panel of one embodiment of the present invention, the Young's modulus of the bonding layer ranges preferably from 1 kPa to 100 kPa, more preferably from 1 kPa to 50 kPa.

The minimum radius of curvature of the touch panel in one embodiment of the present invention when bent can range from 1 mm to 150 mm and ranges preferably from 1 mm to 100 mm, more preferably from 1 mm to 50 mm, still more preferably from 1 mm to 5 mm, for example.

To reduce an adverse effect of the parasitic capacitance, the thickness of the bonding layer is preferably 0.1 mm or larger. For example, in the touch panel of one embodiment of the present invention, the thickness of the bonding layer ranges preferably from 0.1 mm to 1 mm, more preferably from 0.1 mm to 0.5 mm.

The thickness of the bonding layer may be smaller than 0.1 mm when the parasitic capacitance has a small influence, for example, when an active matrix touch sensor described later is used. In such a case, the thickness of the bonding layer of the touch panel in one embodiment of the present invention may be, for example, 0.001 mm or larger and smaller than 0.1 mm, or 0.01 mm or larger and smaller than 0.1 mm; thus, it is possible to obtain a thin touch panel having high resistance to repeated bending and high detection sensitivity.

In the touch panel of one embodiment of the present invention, the transmittance of the bonding layer is preferably 70% or more, further preferably 90% or more. The transmittance of the bonding layer is preferably high because a user of the touch panel sees display of the display panel through the bonding layer.

In the touch panel of one embodiment of the present invention, the penetration of the bonding layer is preferably more than 75, further preferably 100 or more.

In the touch panel of one embodiment of the present invention, the compression set of the bonding layer is preferably 50% or less.

The preferred ranges of the thickness, Young's modulus, transmittance, penetration, and compression set of the bonding layer are described above. In one embodiment of the present invention, the entire bonding layer does not necessarily have a value in the aforementioned range, and at least part of the bonding layer needs to have a value within the range.

For example, in one embodiment of the present invention, the bonding layer includes a first portion with a Young's modulus of 1 kPa to 300 kPa. Furthermore, in one embodiment of the present invention, the bonding layer includes a second portion with a thickness of 0.1 mm to 1 mm. In one embodiment of the present invention, the bonding layer includes a third portion with a transmittance of 70% or more. The same applies to the case of the penetration and the compression set.

In the touch panel of one embodiment of the present invention, the bonding layer may be a gel. An example of a material for the bonding layer is a silicone gel. For example, a silicone gel containing low molecular weight siloxane may be used.

FIG. 1A is a schematic diagram of a touch panel in one embodiment of the present invention.

The touch panel in FIG. 1A includes a display panel 11, a bonding layer 12, and a touch sensor 13.

Figure 1B:
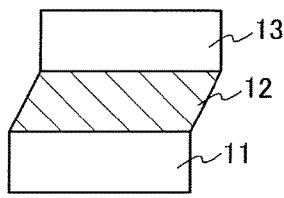

FIG. 1B is a schematic diagram of the touch panel in FIG. 1A when bent. When the touch panel is bent, the relative position between the display panel 11 and the touch sensor 13 changes because of their different radii of curvature. Here, the bonding layer 12 used in one embodiment of the present invention can change its shape by the bending as illustrated in FIG. 1B. Thus, bending the touch panel does not easily cause peeling of the bonding layer 12 and a crack in the bonding layer 12.

In a touch sensor and a display panel that overlap each other with a bonding layer provided therebetween, Example described later will focus on the position of a layer on the touch sensor side and the position of a layer on the display panel side. Specifically, it will be examined whether the position of the layer on the touch sensor side relative to that of the layer on the display panel side changes or not when the touch sensor and the display panel are bent and when they are not.

Example focuses on a color filter provided on the display panel side and an electrode provided on the touch sensor side, and compares a state in FIG. 18A where a sample is not bent and a state in FIG. 18B where the sample is bent. In FIGS. 18A and 18B, a left picture shows an actual sample and a right schematic diagram illustrates the positional relation between a color filter 98 and an electrode 99 in the sample seen from above. When the sample fabricated in Example is bent, the position of the electrode 99 relative to that of the color filter 98 changes. It is thus considered that a bonding layer placed between the touch sensor and the display panel changes its shape by the bending.

Figure 1C:
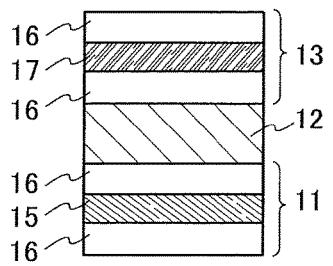
Figure 1D:
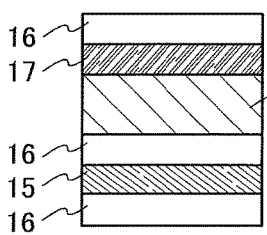
Figure 1E:
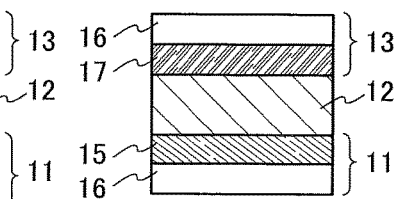

FIGS. 1C to 1E illustrate structure examples of the touch panel. Each of the touch panels illustrated in FIGS. 1C to 1E includes the display panel 11, the bonding layer 12, and the touch sensor 13. Structures of the display panel 11 and the touch sensor 13 are different in FIGS. 1C to 1E.

In FIG. 1C, the display panel 11 includes a display element 15 and a pair of flexible substrates 16. The display element 15 is placed between the pair of flexible substrates 16. In FIG. 1C, the touch sensor 13 includes a sensing element (also referred to as sensor element) 17 and a pair of flexible substrates 16. The sensing element 17 is placed between the pair of flexible substrates 16. As above, the touch panel of one embodiment of the present invention includes four flexible substrates 16. One of the flexible substrates 16 in the display panel 11 and one of the flexible substrates 16 in the touch sensor 13 face each other and are bonded with the bonding layer 12. That is, in the touch panel of one embodiment of the present invention, the sensing element 17 overlaps the display element 15 with two flexible substrates 16 placed therebetween.

In FIG. 1D, the display panel 11 includes the display element 15 and a pair of flexible substrates 16 as in FIG. 1C. In FIG. 1D, the touch sensor 13 includes the sensing element 17 and one flexible substrate 16. The sensing element 17 and one of the flexible substrates 16 in the display panel 11 face each other and are bonded with the bonding layer 12. As above, the touch panel of one embodiment of the present invention may include three flexible substrates 16.

That is, in the touch panel of one embodiment of the present invention, the sensing element 17 overlaps the display element 15 with one flexible substrate 16 placed therebetween.

A structure where the sensing element 17 overlaps the display element 15 with one flexible substrate 16 placed therebetween is not limited to that shown in FIG. 1D. For example, it is possible that the touch sensor 13 includes the sensing element 17 and a pair of flexible substrates 16 and the display panel 11 includes the display element 15 and one flexible substrate 16. In this case, the display element 15 and one of the flexible substrates 16 in the touch sensor 13 may face each other and be bonded with the bonding layer 12. It is also possible that another functional element, a functional layer, an insulating layer, a conductive layer, or the like is provided between the flexible substrate 16 and the display element 15 or the sensing element 17.

In FIG. 1E, the display panel 11 includes the flexible substrate 16 and the display element 15. In FIG. 1E, the touch sensor 13 includes the sensing element 17 and one flexible substrate 16 as in FIG. 1D. The display element 15 and the sensing element 17 face each other and are bonded with the bonding layer 12. As above, the touch panel of one embodiment of the present invention may include two flexible substrates 16.

That is, in the touch panel of one embodiment of the present invention, the display element 15 and the sensing element 17 overlap with each other without the flexible substrate 16 provided therebetween.

A structure where the display element 15 and the sensing element 17 overlap with each other without the flexible substrate 16 therebetween is not limited to that shown in FIG. 1E. For example, another functional element, a functional layer, an insulating layer, a conductive layer, or the like may be provided between the display element 15 and the sensing element 17.

Although this embodiment shows the examples in which the touch panel includes two, three, or four flexible substrates, there is no limitation on the number of flexible substrates. It is preferred that the touch panel include a fewer flexible substrates, in which case the thickness of the entire touch panel can be reduced or the weight of the touch panel can be reduced.

FIG. 1F, FIGS. 2A and 2B, FIG. 3, and FIGS. 19A and 19B are schematic cross-sectional views of the touch panel of one embodiment of the present invention.

Figure 1F:
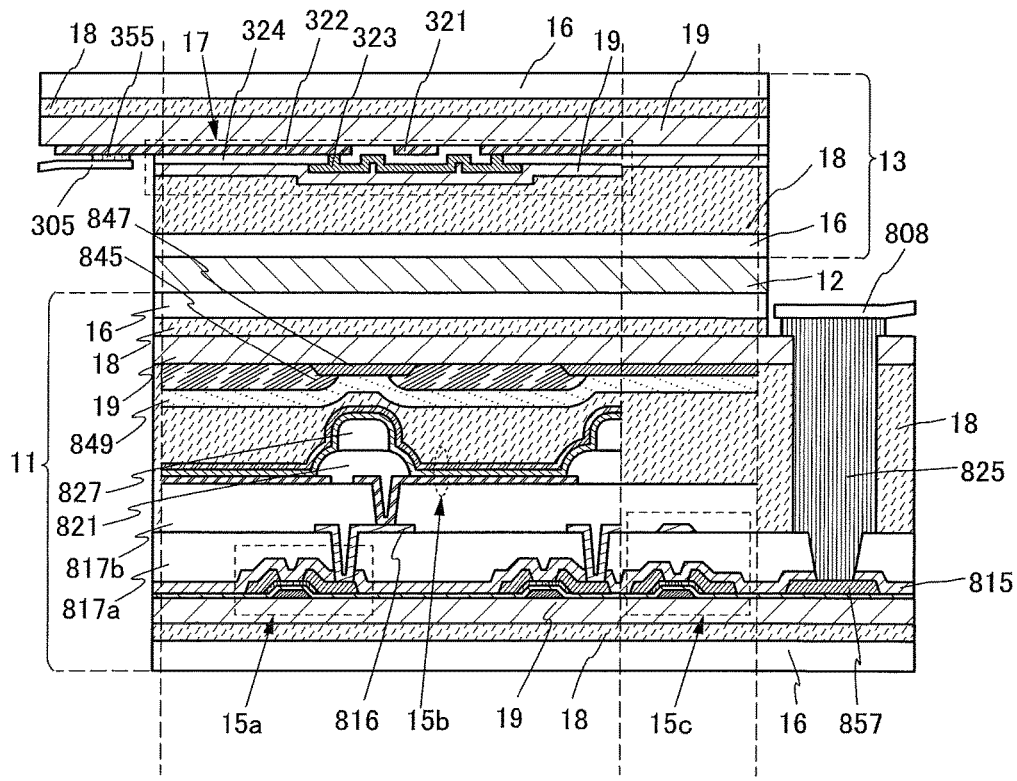

The touch panel illustrated in FIG. 1F includes the display panel 11, the bonding layer 12, and the touch sensor 13. The touch panel in FIG. 1F is an example of the touch panel in FIG. 1C including four flexible substrates 16.

The display panel 11 illustrated in FIG. 1F includes four flexible substrates 16, three bonding layers 18, two insulating layers 19, a transistor 15a, a transistor 15c, a conductive layer 857, an insulating layer 815, a conductive layer 816, an insulating layer 817a, an insulating layer 817b, a light-emitting element 15b, an insulating layer 821, a spacer 827, a coloring layer 845, a light-blocking layer 847, an overcoat 849, and the like.

The insulating layer 19 and the flexible substrate 16 are attached with the bonding layer 18.

A source electrode or a drain electrode of the transistor 15a is electrically connected to a lower electrode of the light-emitting element 15b through the conductive layer 816.

There is no particular limitation on the transistors included in the touch panel of one embodiment of the present invention. The transistor 15a has a bottom-gate structure but may have a top-gate structure. The transistor 15c has a dual-gate structure including a first gate electrode on a surface where a gate electrode of the transistor 15a is provided and a second gate electrode on a surface where the conductive layer 816 is provided, but is not limited to having this structure.

A transistor included in a driver circuit portion and a transistor included in a display portion (also referred to as pixel portion or light-emitting portion) may have the same structure or different structures. Transistors in the driver circuit portion may have the same structure or two or more structures. Transistors in the display portion may have the same structure or two or more structures.

The coloring layer 845 overlaps a light-emitting region of the light-emitting element 15b. The light-blocking layer 847 overlaps the insulating layer 821.

The touch sensor 13 in FIG. 1F includes two flexible substrates 16, two bonding layers 18, two insulating layers 19, the sensing element 17, and the like.

The sensing element 17 includes an electrode 321, an electrode 322, a wiring 323, and a dielectric layer 324.

The conductive layer 857 and a flexible printed circuit (FPC) 808 are electrically connected to each other through a connector 825. The electrode 322 and an FPC 305 are electrically connected to each other through a connector 355.

Embodiment 4 can be referred to for structures of the flexible substrate 16, the bonding layer 18, and the insulating layer 19. Moreover, the bonding layer 18 may be formed using a material for the bonding layer 12.

Figure 19A:
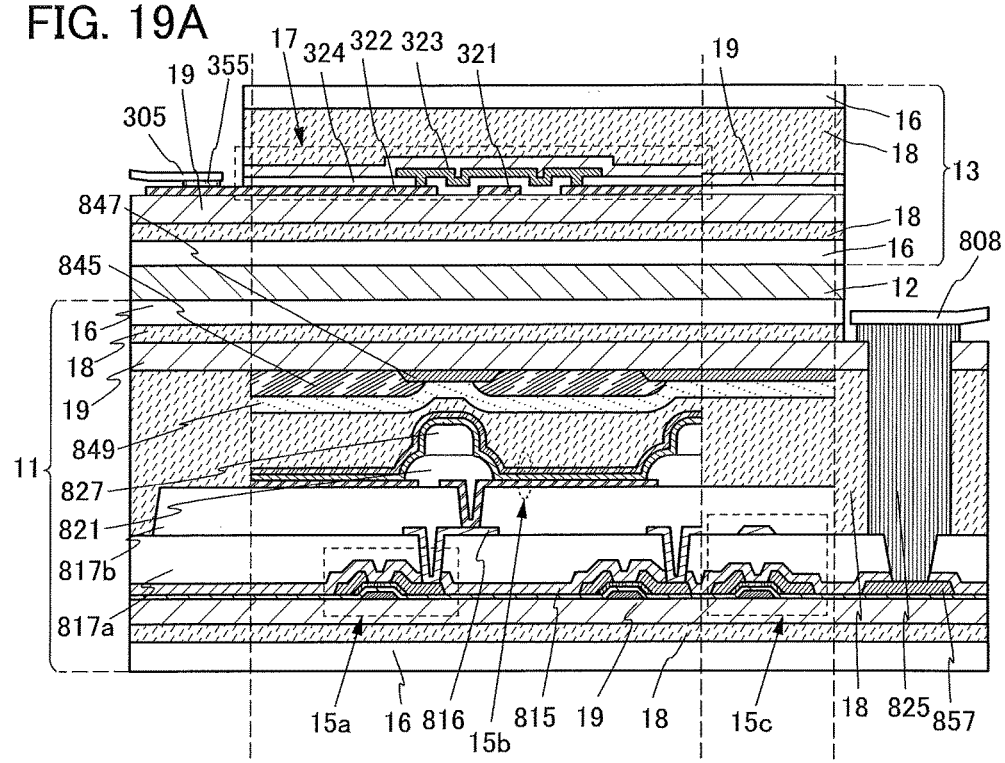
FIGS. 19A and 19B illustrate examples of a touch panel of one embodiment of the present invention.

The touch panel illustrated in FIG. 19A is another example of the touch panel in FIG. 1C including four flexible substrates 16. The touch panel in FIG. 19A is different from that in FIG. 1F in a surface of the touch sensor 13 attached to the display panel 11. In the structure of FIG. 19A, the flexible substrate 16 to which the FPC 305 is attached is in contact with the bonding layer 12. In other words, there is no limitation on a surface of the touch sensor 13 attached to the display panel 11.

Figure 2A:
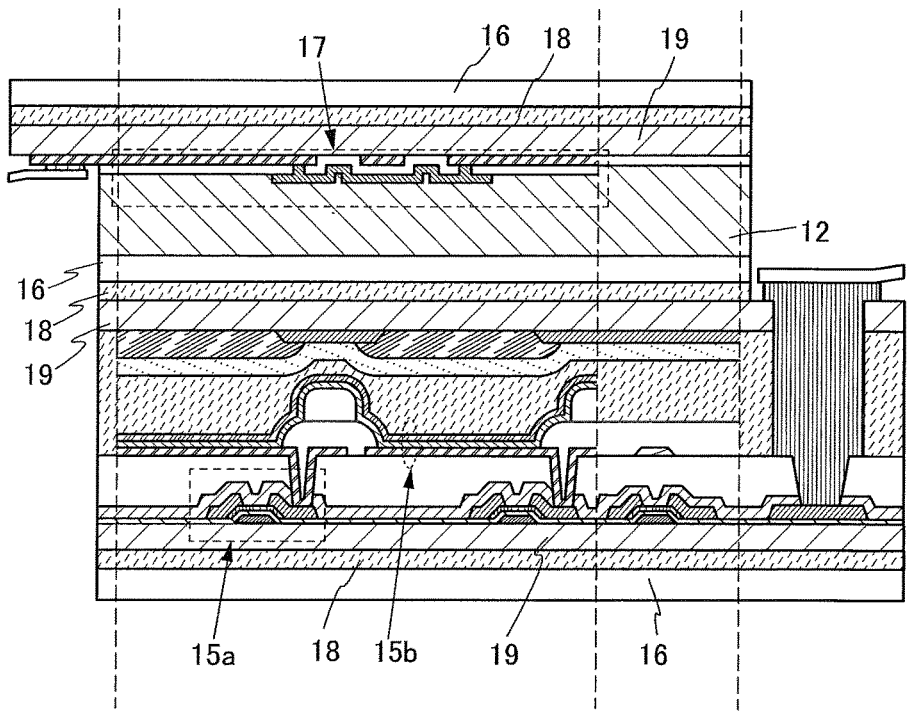
FIGS. 2A and 2B illustrate examples of a touch panel of one embodiment of the present invention.

The touch panel illustrated in FIG. 2A is an example of the touch panel in FIG. 1D including three flexible substrates 16. The touch panel in FIG. 2A is different from that in FIG. 1F in that the sensing element 17 overlaps the bonding layer 12 without placing the insulating layer 19, the bonding layer 18, and the flexible substrate 16 therebetween.

Figure 2B:
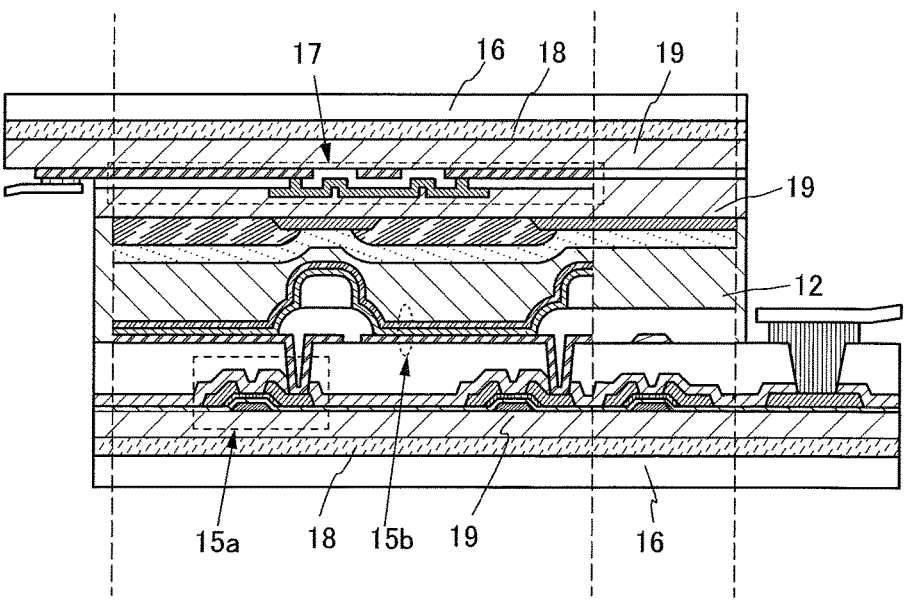

The touch panel illustrated in FIG. 2B is an example of the touch panel in FIG. 1E including two flexible substrates 16. The touch panel in FIG. 2B is different from that in FIG. 2A in that the light-emitting element 15b overlaps the bonding layer 12 without placing the insulating layer 19, the bonding layer 18, and the flexible substrate 16 therebetween; and in that the insulating layer 19, a coloring layer, a light-blocking layer, and an overcoat are provided between the sensing element 17 and the bonding layer 12.

The coloring layer and the light-blocking layer may each be provided on the display element or touch sensor side with respect to the bonding layer 12.

Figure 19B:
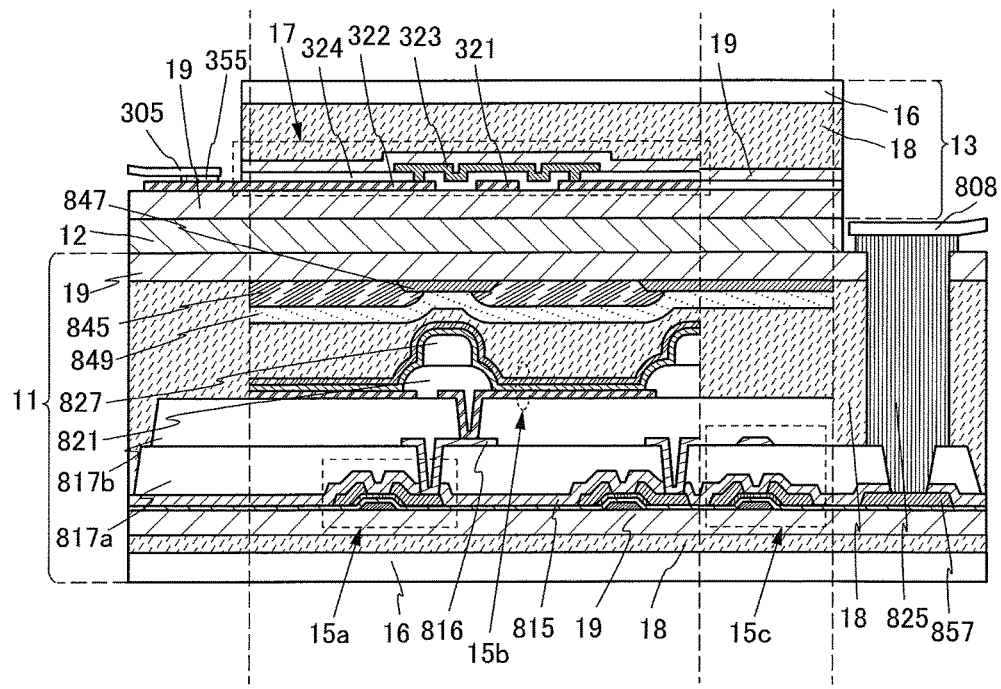

The touch panel illustrated in FIG. 19B is another example of the touch panel in FIG. 1E including two flexible substrates 16. The display panel 11 and the touch sensor 13 each include one flexible substrate 16. The insulating layer 19 is placed on the outermost surface of each of the display panel 11 and the touch sensor 13 on which the flexible substrate 16 is not provided. The touch panel in FIG. 19B can be fabricated by attaching the insulating layers 19 with the bonding layer 12. FIG. 19B illustrates an example where a coloring layer and a light-blocking layer are provided on the display element side with respect to the bonding layer 12.

As illustrated in FIG. 19B, the insulating layers 817a and 817b are not necessarily exposed at end portions of the touch panel. This structure is preferable when an organic resin is used for the insulating layers 817a and 817b because entry of moisture or the like can be prevented.

Figure 3:
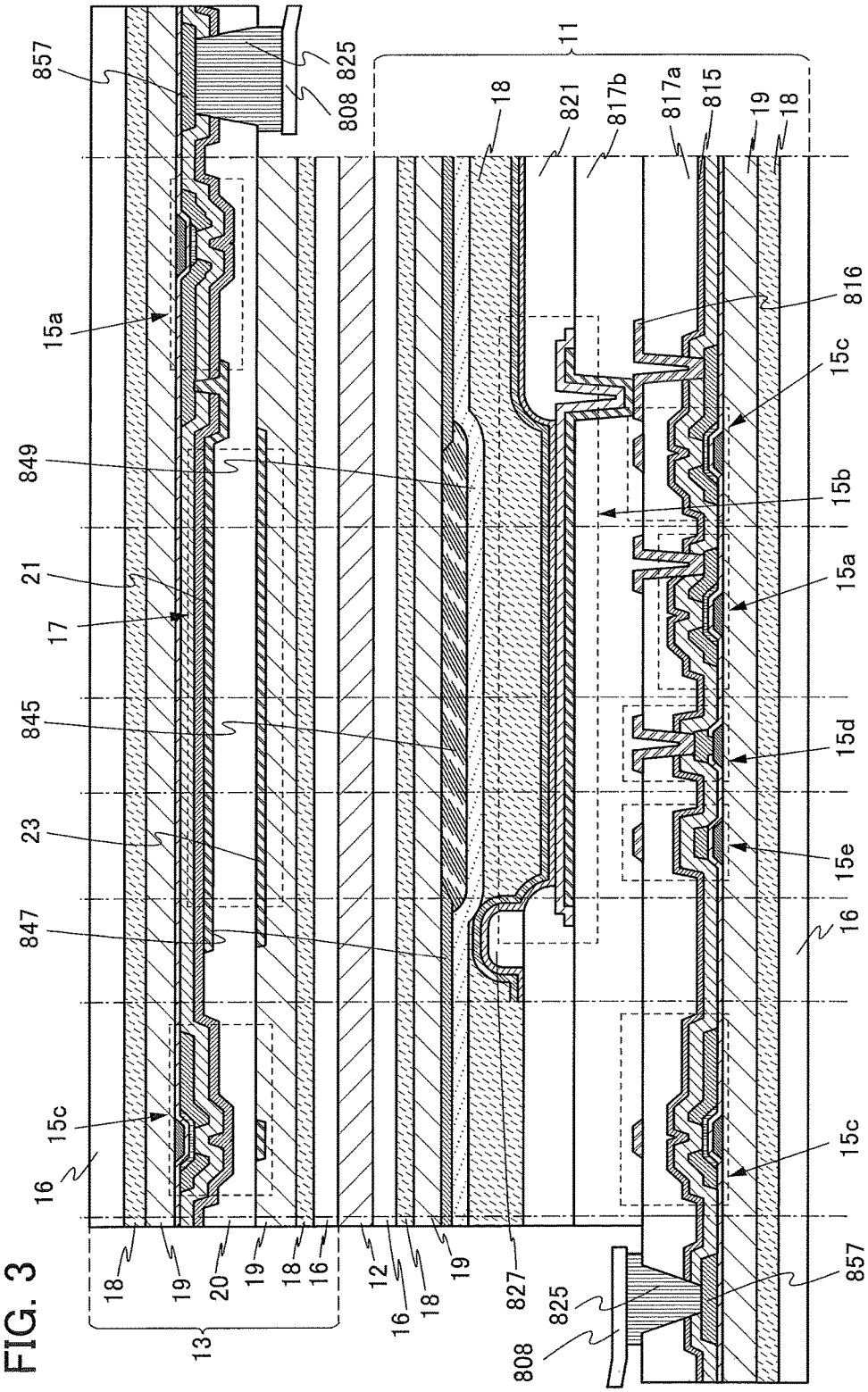
FIG. 3 illustrates an example of a touch panel of one embodiment of the present invention.

The touch panel in FIG. 3 is another example of the touch panel in FIG. 1C including four flexible substrates 16.

The display panel 11 illustrated in FIG. 3 includes two flexible substrates 16, three bonding layers 18, two insulating layers 19, a plurality of transistors, a contact portion 15d, a capacitor portion 15e, the conductive layer 857, the insulating layer 815, the conductive layer 816, the insulating layer 817a, the insulating layer 817b, the light-emitting element 15b, the insulating layer 821, the spacer 827, the coloring layer 845, the light-blocking layer 847, the overcoat 849, and the like.

In FIG. 3, the transistor 15c is used in a driver circuit portion and as a transistor whose source electrode or drain electrode is connected to a lower electrode of the light-emitting element 15b. The transistor 15a is used as another transistor in a display portion. The transistor 15c can have higher field-effect mobility and higher on-state current than the transistor 15a. Thus, a driver circuit portion capable of high-speed operation is obtained, and a touch panel including the driver circuit portion that occupies a small area can be fabricated. Furthermore, providing the transistor 15c with high on-state current in the display portion can reduce signal delays in wirings and display unevenness even in a large touch panel and a high-definition touch panel that include a large number of wirings.

The touch sensor 13 in FIG. 3 is an active matrix touch sensor including a transistor and a capacitor. The transistor and the capacitor are electrically connected to each other.

The touch sensor 13 includes two flexible substrates 16, two bonding layers 18, two insulating layers 19, the sensing element 17, and the like.

The sensing element 17 is a capacitor including a conductive layer 21, a conductive layer 23, and an insulating layer 20. The sensing element 17 is electrically connected to the transistor 15a.

It is preferable to form layers included in a transistor and electrodes and a dielectric layer of a capacitor in the same steps, in which case a touch panel can be fabricated through a smaller number of steps. FIG. 3 illustrates an example of using the conductive layer 23 that can be formed in the same step as the second gate electrode of the transistor 15c. Examples of layers formed in the same step as a capacitor electrode include a gate electrode, a source electrode, a drain electrode, and a semiconductor layer of a transistor and a wiring.

In the case of using an active matrix touch sensor, the number of flexible substrates 16 may be reduced to two or three.

Embodiment 2 can be referred to for the details of the sensing element 17 illustrated in FIG. 1F, FIGS. 2A and 2B, and FIGS. 19A and 19B. Embodiment 3 can be referred to for the details of the active matrix touch sensor illustrated in FIG. 3.

Note that there is no particular limitation on the touch sensor included in the touch panel of one embodiment of the present invention.

In one embodiment of the present invention, a capacitive touch sensor can be used, for example. Examples of a capacitive touch sensor are a surface capacitive touch sensor and a projected capacitive touch sensor. Examples of a projected capacitive touch sensor are a self-capacitive touch sensor and a mutual capacitive touch sensor. The use of a mutual capacitive touch sensor is preferable because multiple points can be sensed simultaneously. Alternatively, a resistive touch sensor, an ultrasonic touch sensor, or an optical touch sensor may be used.

In one embodiment of the present invention, an active matrix touch sensor or a passive matrix touch sensor can be used.

Specific Example 2 in Embodiment 4 can be referred to for the details of the display panel 11.

There is no particular limitation on the display panel and the display element included in the touch panel of one embodiment of the present invention. In this embodiment, a light-emitting element is described as an example of the display element; however, a display panel in one embodiment of the present invention may be a panel or a device using a different kind of display element or light-emitting element.

Note that in this specification and the like, a display element, a display device which is a device including a display element, a light-emitting element, and a light-emitting device which is a device including a light-emitting element can employ various modes or can include various elements. A display element, a display device, a light-emitting element, or a light-emitting device includes at least one of the following, for example: an EL element (e.g., an EL element including organic and inorganic materials, an organic EL element, and an inorganic EL element), an LED (e.g., a white LED, a red LED, a green LED, and a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical system (MEMS), a digital micromirror device (DMD), a digital micro shutter (DMS), an interferometric modulator (IMOD) element, a MEMS shutter display element, an optical-interference-type MEMS display element, an electrowetting element, a piezoelectric ceramic display, and a display element using a carbon nanotube. Other than the above, a display medium whose contrast, luminance, reflectance, transmittance, or the like is changed by electric or magnetic action may be included. An example of a display device having EL elements is an EL display. Examples of a display device including electron emitters are a field emission display (FED) and an SED-type flat panel display (SED: surface-conduction electron-emitter display). An example of a display device including liquid crystal elements includes a liquid crystal display (e.g., a transmissive liquid crystal display, a transflective liquid crystal display, a reflective liquid crystal display, a direct-view liquid crystal display, and a projection liquid crystal display). An example of a display device using electronic ink, Electronic Liquid Powder (registered trademark), or electrophoretic elements is electronic paper. In a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as SRAM can be provided under the reflective electrodes, leading to lower power consumption.

For example, in this specification and the like, it is possible to employ an active matrix method in which an active element (a non-linear element) is included in a pixel or a passive matrix method in which an active element is not included in a pixel.

In the active matrix method, not only a transistor but also a variety of active elements, for example, a metal insulator metal (MIM) or a thin film diode (TFD) can be used. These elements are fabricated with a small number of steps, resulting in low manufacturing cost or high yield. Furthermore, since these elements are small, the aperture ratio can be increased, leading to low power consumption and high luminance.

Since an active element is not used in the passive matrix method, the number of manufacturing steps is small, so that the manufacturing cost can be reduced or the yield can be increased. Furthermore, since an active element is not used, the aperture ratio can be improved, leading to low power consumption or high luminance.

Embodiment 1 shows examples of a touch panel that performs display using a display device; however, one embodiment of the present invention is not limited to these examples. For example, the touch panel does not necessarily display data and may be used as a lighting device instead of as a display device. By using the touch panel as a lighting device, it can be used for interior lighting having an attractive design or as lighting from which light radiates in various directions. Alternatively, it may be used as a light source such as a backlight or a front light, that is, a lighting device for a display panel.

As described above, one embodiment of the present invention is a flexible touch panel in which a flexible display panel and a flexible touch sensor are attached with a bonding layer. The bonding layer having a Young's modulus of 1 kPa to 300 kPa achieves the touch panel that has high resistance to repeated bending and high detection sensitivity.

This embodiment can be combined with any other embodiment as appropriate.

Embodiment 2

In this embodiment, a touch sensor of one embodiment of the present invention will be described.

Figure 4:
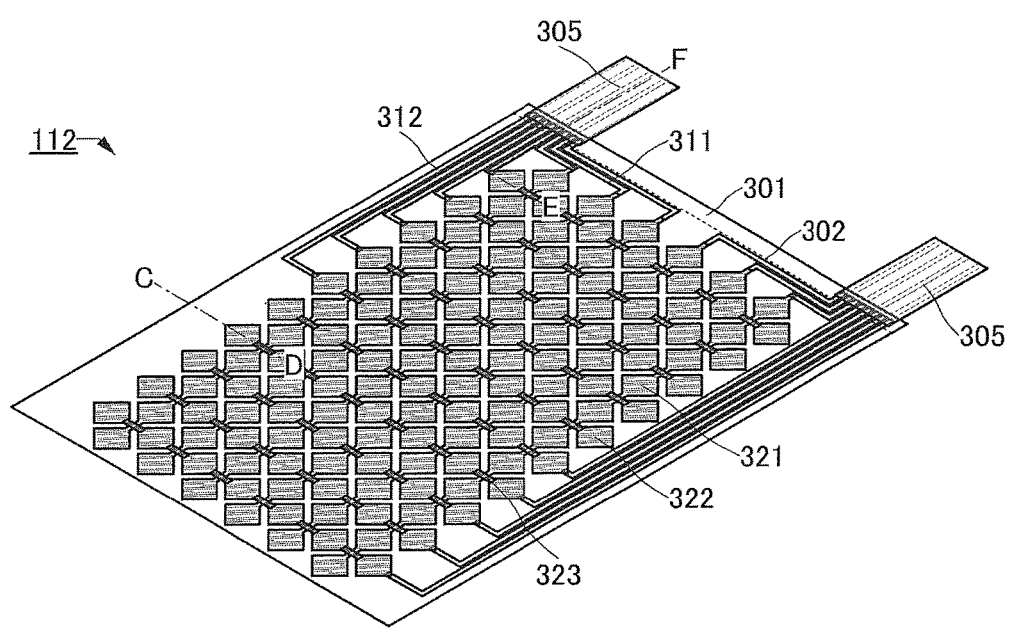
FIG. 4 illustrates an example of a touch sensor of one embodiment of the present invention.

FIG. 4 illustrates a touch sensor 112 that is a projected capacitive touch sensor. FIG. 5A is a cross-sectional view along lines C-D and E-F in FIG. 4.

The touch sensor 112 includes a plurality of electrodes 321 and a plurality of electrodes 322 between a flexible substrate 301 and a flexible substrate 302. The electrode 321 is electrically connected to one of a plurality of wirings 311. The electrode 322 is electrically connected to one of a plurality of wirings 312. The wirings 311 and 312 are extended to the periphery of the flexible substrate 301 and electrically connected to the FPCs 305.

The electrode 321 has a shape extending in one direction. Each of the electrodes 322 is provided between two electrodes 321. Two electrodes 322 between which the electrode 321 is placed are electrically connected to each other by a wiring 323 that intersects with the electrode 321. The dielectric layer 324 is provided between the wiring 323 and the electrode 321, so that a capacitor is formed. In the touch sensor 112, the plurality of electrodes 322 are electrically connected by the wirings 323 and arranged in one direction, and the plurality of electrodes 321 are arranged in the direction intersecting with the direction of the electrodes 322; thus, capacitors are arranged in a matrix.

The electrode 321, the electrode 322, and the wiring 323 preferably have a light-transmitting property. As shown in FIG. 4, the electrodes 321 and 322 preferably have a shape with which hardly any space is generated therebetween. Moreover, a dummy electrode including the same conductive film as the electrode 321, the electrode 322, or the wiring 323 may be provided at the space between the electrodes 321 and 322. Reducing a space between the electrodes 321 and 322 as much as possible in such a manner can reduce transmittance variation. As a result, unevenness in luminance of light transmitted through the touch sensor 112 can be reduced.

As a light-transmitting conductive material, it is possible to use a conductive oxide such as indium oxide, indium oxide containing tungsten oxide, indium zinc oxide containing tungsten oxide, indium oxide containing titanium oxide, indium tin oxide containing titanium oxide, indium tin oxide (ITO), indium zinc oxide, indium tin oxide to which silicon oxide is added, or zinc oxide to which gallium is added or graphene.

The electrodes 321 and 322 and the wiring 323 can be formed in such a manner that a light-transmitting conductive material is deposited on the substrate by sputtering and then an unnecessary portion is removed by any of various patterning techniques such as photolithography. Graphene may be formed by CVD or by application of a solution in which graphene oxide is dispersed and subsequent reduction of graphene oxide.

The wiring 312 is electrically connected to the electrode 322. The wiring 312 is provided so that its surface is exposed at the periphery of the flexible substrate 301, and can be electrically connected to the FPC 305 through the connector 355. Note that the wiring 311 electrically connected to the electrode 321 can have a similar structure.

For the wirings 311 and 312, a metal material such as aluminum, gold, platinum, silver, nickel, titanium, tungsten, chromium, molybdenum, iron, cobalt, copper, or palladium or an alloy material containing any of these metal materials can be used.

For the connector 355, an anisotropic conductive film (ACF), an anisotropic conductive paste (ACP), or the like can be used.

In the structure example in FIG. 5A, the electrode 321 and the electrode 322 are formed over an insulating layer 320. The flexible substrate 301 and the insulating layer 320 are bonded to each other with a bonding layer 331 placed therebetween. The flexible substrate 302 and the flexible substrate 301 provided with the electrodes and the like are bonded to each other with a bonding layer 332.

The bonding layers 331 and 332 have a light-transmitting property. For example, the bonding layers 331 and 332 can be formed using a thermosetting resin or an ultraviolet curable resin, specifically an acrylic resin, a urethane resin, an epoxy resin, or a resin having a siloxane bond.

A protection layer 335 is preferably provided on a surface of the flexible substrate 302. The protection layer 335 can be referred to as a ceramic coat and has a function of protecting the surface of the flexible substrate 302 when the touch sensor 112 is operated with a finger, a stylus, or the like. The provision of the protection layer 335 is particularly preferred when an exterior component is not provided. The protection layer 335 can be formed using an inorganic insulating material such as silicon oxide, aluminum oxide, yttrium oxide, or yttria-stabilized zirconia (YSZ) by sputtering, a sol-gel method, or the like. Aerosol deposition is particularly preferably employed to form the protection layer 335, in which case a high-density film can be formed at low temperature and the mechanical strength of the protection layer 335 can be increased.

The protection layer 335 is provided at least on the touch surface. FIG. 5A shows the case where the protection layer 335 is provided on the surface of the flexible substrate 302; alternatively, the protection layer 335 may be provided on a surface of the flexible substrate 301.

It is possible that the bonding layer 331 is not provided. FIG. 5B illustrates a structure where the insulating layer 320 is provided on a top surface of the flexible substrate 301. FIG. 5C illustrates a structure where the insulating layer 320 is also omitted and the electrode 321, the electrode 322, and the like are provided over the flexible substrate 301.

Figure 6A:
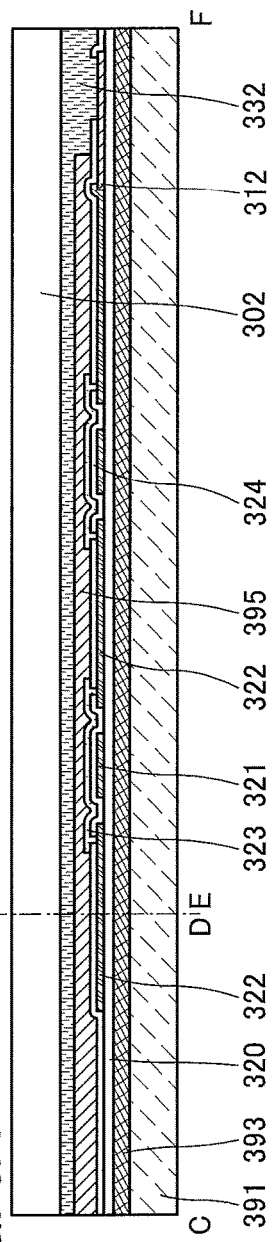
FIGS. 6A to 6C illustrate an example of a method for fabricating a touch sensor of one embodiment of the present invention.
Figure 6B:
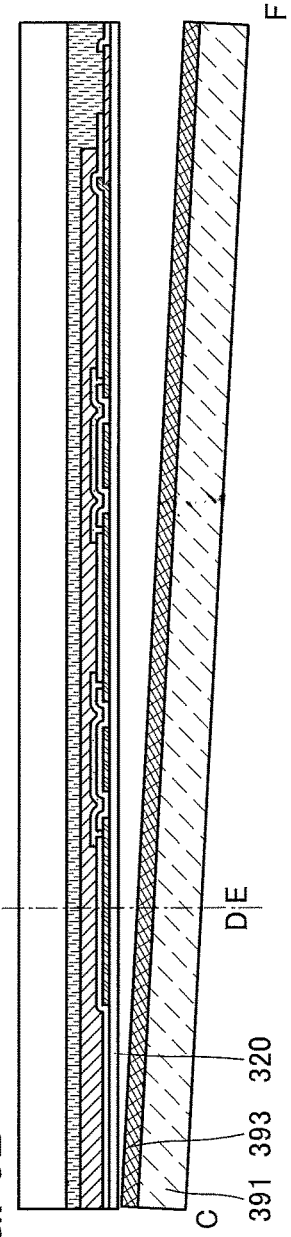
Figure 6C:
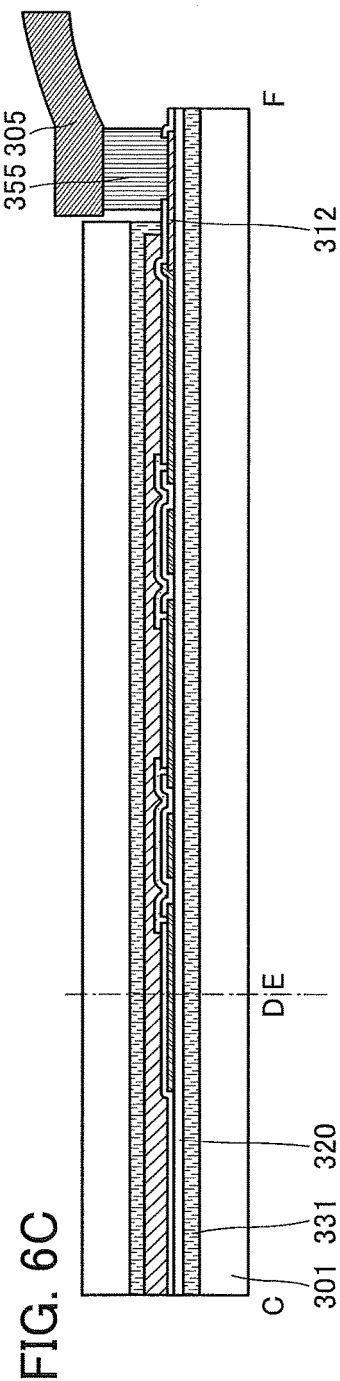

FIG. 6C illustrates a structure example of a touch sensor different from those shown in FIGS. 5A to 5C. An example of a method for fabricating the touch sensor in FIG. 6C will be described with reference to FIGS. 6A and 6B.

A layer to be separated (hereinafter referred to as peeled layer) can be formed over a formation substrate, and then separated from the formation substrate and transferred to another substrate. With this method, for example, a peeled layer formed over a formation substrate having high heat resistance can be transferred to a substrate having low heat resistance; thus, the forming temperature of the peeled layer is not limited by the substrate having low heat resistance.

First, a separation layer 393 is formed over a formation substrate 391, and a peeled layer is formed over the separation layer 393. As the peeled layer, the insulating layer 320, the electrode 321, the electrode 322, the wiring 312, the dielectric layer 324, the wiring 323, an insulating layer 395, the bonding layer 332, and the flexible substrate 302 are formed (FIG. 6A).

The insulating layer 395 functions as a protection layer for the touch sensor. The insulating layer 395 is preferably provided in one embodiment of the present invention but is not necessarily provided when not needed. The insulating layer 395 can be an inorganic insulating film or an organic insulating film, such as a silicon oxynitride film or an acrylic film. The thickness of the insulating layer 395 ranges from 500 nm to 2000 nm, for example. Note that the insulating layer 395 may be formed using an inorganic material or an organic material that can be used for another insulating layer, and its thickness is not limited to the above range.

Then, the formation substrate 391 and the peeled layer are separated from each other using the separation layer 393 (FIG. 6B).

Next, the exposed insulating layer 320 and the flexible substrate 301 are attached to each other with the bonding layer 331 (FIG. 6C). Furthermore, part of the flexible substrate 302 and part of the bonding layer 332 are removed, for example, by dissolving a resin included in the substrate to expose the wiring 312. Then, the wiring 312, the connector 355, and the FPC 305 are made electrically connected to each other.

Through the above steps, the touch sensor with the structure illustrated in FIG. 6C can be fabricated. Note that Embodiment 3 can be referred to for the details of the method for transferring a peeled layer from a formation substrate to another substrate by using a separation layer.

This embodiment can be combined with any other embodiment as appropriate.

Embodiment 3

In this embodiment, a touch sensor of one embodiment of the present invention will be described.

FIGS. 7A to 7D are diagrams for explaining a structure of a touch sensor 100 in one embodiment of the present invention. FIGS. 8A to 8C are diagrams for explaining a structure of a touch sensor 100B in one embodiment of the present invention.

Figure 7A:
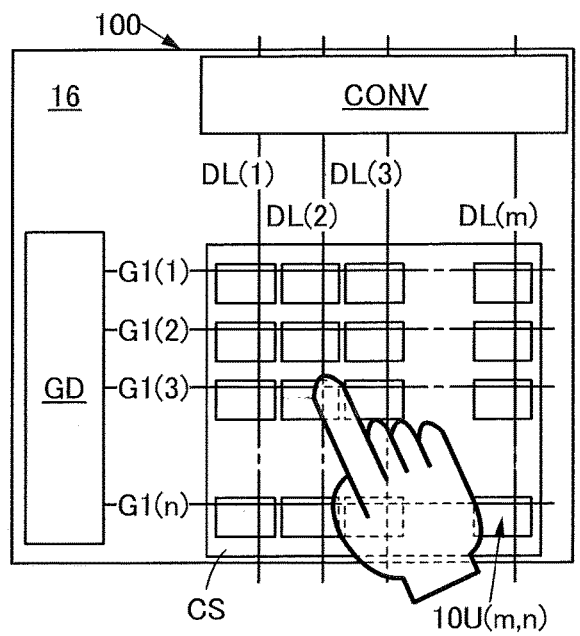
FIGS. 7A and 7B illustrate an example of a structure of a touch sensor in one embodiment of the present invention.
Figure 7B:
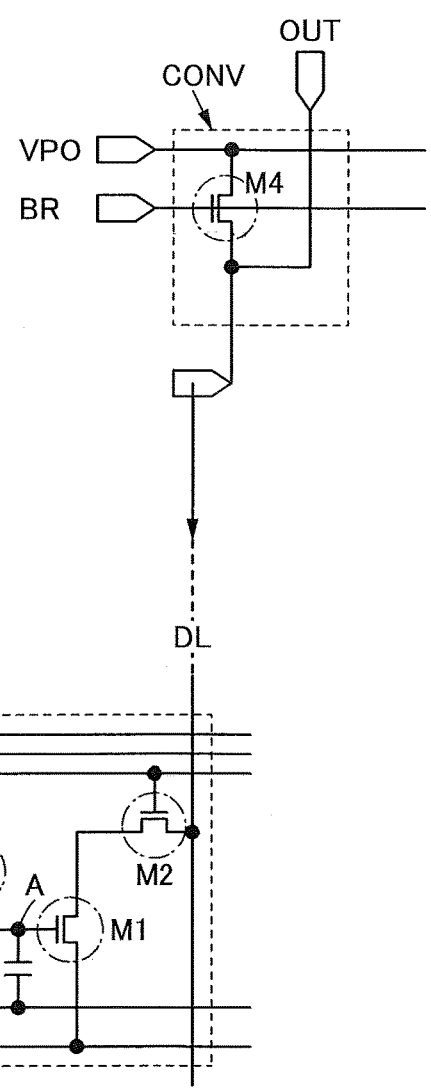
Figure 7C:
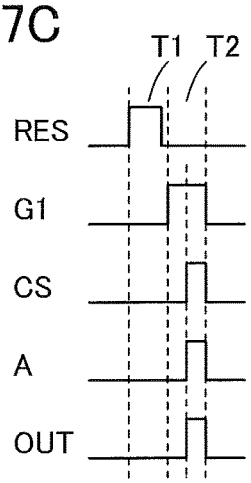
FIGS. 7C and 7D illustrate an example of a method for driving the touch sensor.
Figure 7D:
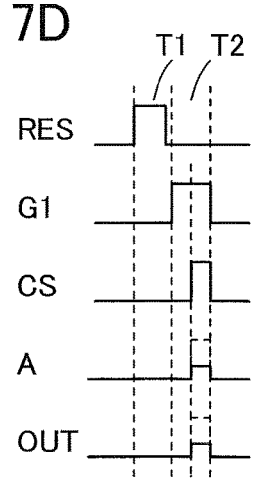
Figure 8A:
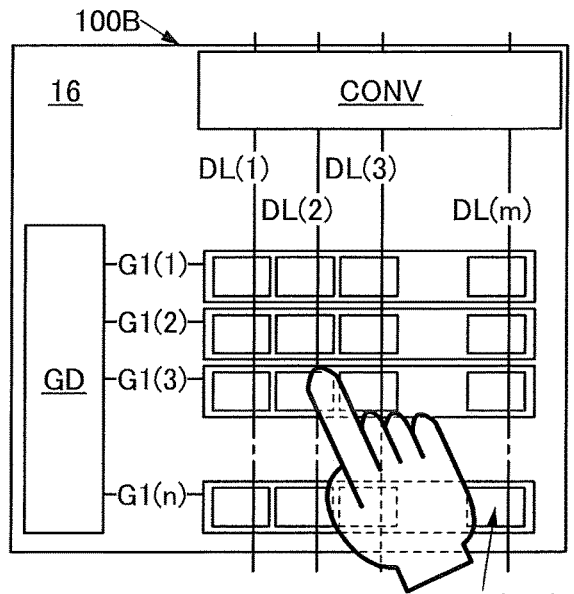
FIGS. 8A and 8B illustrate an example of a structure of a touch sensor in one embodiment of the present invention.
Figure 8B:
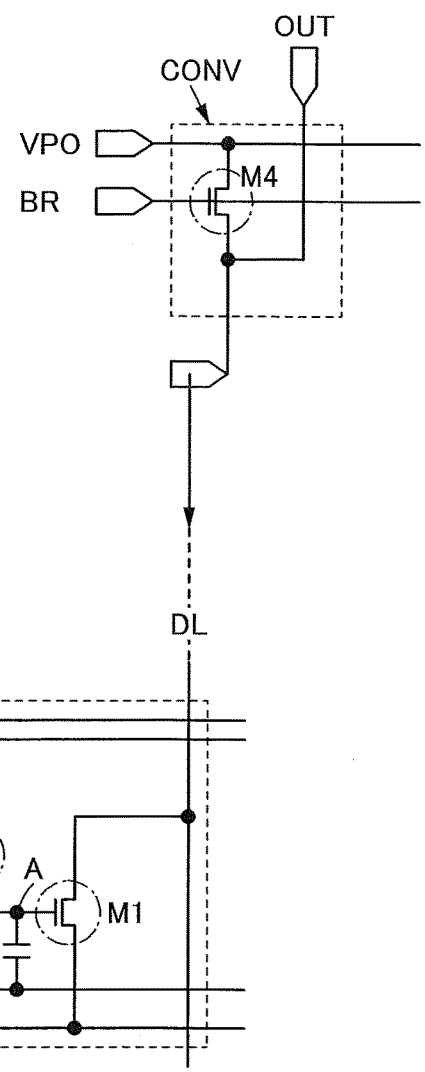
Figure 8C:
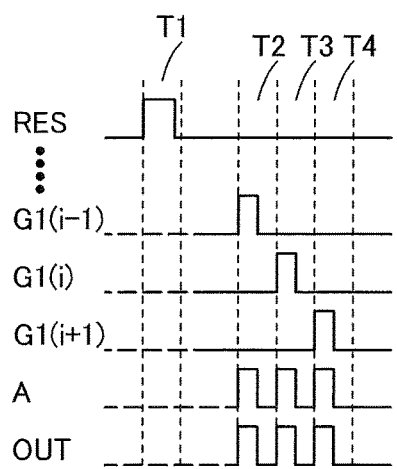
FIG. 8C illustrates an example of a method for driving the touch sensor.

FIG. 7A is a block diagram illustrating the structure of the touch sensor 100 in one embodiment of the present invention. FIG. 7B is a circuit diagram illustrating configurations of a converter CONV and a sensing unit 10U. FIGS. 7C and 7D are timing charts for explaining a method for driving the touch sensor 100.

FIG. 8A is a block diagram illustrating the structure of the touch sensor 100B in one embodiment of the present invention. FIG. 8B is a circuit diagram illustrating configurations of the converter CONV and a sensing unit 10UB. FIG. 8C is a timing chart for explaining a method for driving the touch sensor 100B.

<Touch Sensor Structure Example 1>

The touch sensor 100 described in this embodiment includes a plurality of sensing units 10U, scan lines G1, signal lines DL, and the flexible substrate 16 (FIG. 7A). The sensing units 10U are arranged in a matrix of n rows and m columns (n and in are each a natural number of 1 or more). Each scan line G1 is electrically connected to sensing units 10U arranged in the row direction. Each signal line DL is electrically connected to sensing units 10U arranged in the column direction. The touch sensor 100 may also include a driver circuit GD and the converter CONV. The sensing units 10U, the driver circuit GD, and the converter CONV can be configured using transistors formed in the same process.

The sensing unit 10U includes a sensing element C having a first electrode electrically connected to a wiring CS; thus, the potential of the first electrode of the sensing element C can be controlled using a control signal supplied through the wiring CS.

The sensing unit 10U includes a first transistor M1 having a gate electrically connected to a second electrode of the sensing element C and a first electrode electrically connected to a wiring VPI (FIG. 7B). The wiring VPI can supply a ground potential, for example.

The sensing unit 10U may include a second transistor M2 in which a gate is electrically connected to the scan line G1, a first electrode is electrically connected to a second electrode of the first transistor M1, and a second electrode is electrically connected to the signal line DL. The scan line G1 can supply a selection signal, for example. The signal line DL can supply a sensing signal DATA, for example.

The sensing unit 10U may include a third transistor M3 in which a gate is electrically connected to a wiring RES, a first electrode is electrically connected to the second electrode of the sensing element C, and a second electrode is electrically connected to a wiring VRES. The wiring RES can supply a reset signal. The wiring VRES can supply, for example, a potential capable of turning on the first transistor M1.

The capacitance of the sensing element C is changed when an object comes close to the first or second electrode or when the distance between the first and second electrodes is changed. Thus, the sensing unit 10U can supply the sensing signal DATA based on a change in the capacitance of the sensing element C or parasitic capacitance.

The sensing unit 10U includes the wiring CS that can supply a control signal capable of controlling the potential of the first electrode of the sensing element C. Note that the first electrode of the sensing element C and the wiring CS may be formed using the same layer.

A node where the second electrode of the sensing element C, the gate of the first transistor M1, and the first electrode of the third transistor M3 are electrically connected is referred to as a node A.

The wiring VRES can supply a predetermined potential. For example, the wiring VRES can provide the gate of the transistor included in the sensing unit 10U with a potential for turning on the transistor. The wiring VPI can supply a ground potential, for example. A wiring VPO and a wiring BR can supply a high power supply potential, for example.

The wiring RES can supply a reset signal. The scan line G1 can supply a selection signal. The wiring CS can supply a control signal for controlling the potential of the first electrode of the sensing element C.

The signal line DL can supply the sensing signal DATA. A terminal OUT can supply a signal obtained by conversion based on the sensing signal DATA.

The driver circuit GD can be configured with a logic circuit using a variety of circuits. For example, a shift register can be used. The converter CONV has a conversion circuit. A variety of circuits that can convert the sensing signal DATA and supply the resulting signal to the terminal OUT can be used for the converter CONV. For example, a source follower circuit or a current mirror circuit may be configured by electrically connecting the converter CONV to the sensing unit 10U.

Specifically, a source follower circuit can be configured with the converter CONV using a transistor M4 (FIG. 7B).

Note that the transistor M4 may be a transistor that can be fabricated in the same steps as the first transistor M1 to the third transistor M3.

The first to third transistors M1 to M3 each include a semiconductor layer containing an element of Group 4, a compound semiconductor, or an oxide semiconductor, for example. Specifically, a semiconductor containing silicon, a semiconductor containing gallium arsenide, or an oxide semiconductor containing indium can be used.

A method for driving the touch sensor of one embodiment of the present invention will be described.

<<First Step>>

In a first step, a reset signal for turning on the third transistor M3 and subsequently turning off the third transistor M3 is supplied to the gate of the third transistor M3, and a potential of the second electrode of the sensing element C is set at a predetermined potential (see Period T1 in FIG. 7C).

Specifically, a reset signal is supplied from the wiring RES. The third transistor M3 supplied with the reset signal makes the node A have a potential capable of turning on the first transistor M1, for example (FIG. 7B).

<<Second Step>>

In a second step, a selection signal for turning on the second transistor M2 is supplied to the gate of the second transistor M2, and the second electrode of the first transistor M1 is made electrically connected to the signal line DL.

Specifically, a selection signal is supplied from the scan line G1. The second transistor M2 supplied with the selection signal electrically connects the second electrode of the first transistor M1 to the signal line DL (see Period T2 in FIG. 7C).

<<Third Step>>

In a third step, a control signal is supplied to the first electrode of the sensing element C, and a potential that varies depending on the control signal and the capacitance of the sensing element C is supplied to the gate of the first transistor M1.

Specifically, a rectangular control signal is supplied from the wiring CS. The sensing element C having the first electrode supplied with the rectangular control signal increases the potential of the node A depending on the capacitance of the sensing element C (see the latter half of Period T2 in FIG. 7C).

For example, when the sensing element C is placed in the air and an object with a higher dielectric constant than the air comes close to the first electrode of the sensing element C, the apparent capacitance of the sensing element C increases.

Consequently, a change in the potential of the node A due to a rectangular control signal is smaller than that when an object with a higher dielectric constant than the air is not placed close to the first electrode of the sensing element C (see a solid line in FIG. 7D).

<<Fourth Step>>

In a fourth step, a signal based on a change in the gate potential of the first transistor M1 is supplied to the signal line DL.

For example, a current that is changed on the basis of a change in the gate potential of the first transistor M1 is supplied to the signal line DL.

The converter CONV converts a change in current flowing through the signal line DL into a change in voltage and outputs the voltage.

<<Fifth Step>>

In a fifth step, a selection signal for turning off the second transistor M2 is supplied to the gate of the second transistor M2.

The first to fifth steps are repeated for every row of the scan lines G1(1) to G1(n).

<Touch Sensor Structure Example 2>

The touch sensor 100B in this embodiment is different from the touch sensor 100 described using FIGS. 7A to 7D in including the sensing unit 10UB instead of the sensing unit 10U.

The sensing unit 10UB is different from the sensing unit 10U in the following aspects. The first electrode of the sensing element C is electrically connected to the wiring CS in the sensing unit 10U, whereas it is electrically connected to the scan line G1 in the sensing unit 10UB. Moreover, the second electrode of the first transistor M1 is electrically connected to the signal line DL through the second transistor M2 in the sensing unit 10U, whereas it is electrically connected to the signal line DL not through the second transistor M2 in the sensing unit 10UB. Here, a configuration different from that of the sensing unit 10U will be described in detail, and the above description is referred to for portions similar to those in the sensing unit 10U.

The touch sensor 100B includes a plurality of sensing units 10UB, the scan lines G1, the signal lines DL, and the flexible substrate 16 (FIG. 8A). The sensing units 10UB are arranged in a matrix of n rows and in columns (n and in are each a natural number of 1 or more). Each scan line G1 is electrically connected to sensing units 10UB arranged in the row direction. Each signal line DL is electrically connected to sensing units 10UB arranged in the column direction.

The sensing unit 10UB includes the sensing element C having a first electrode electrically connected to the scan line G1. Thus, the potential of the first electrode of the sensing element C can be controlled using a selection signal for each group of sensing units 10UB electrically connected one selected scan line G1.

The scan line G1 can be a wiring formed using a conductive film that can be formed in the same steps as the signal line DL.

Alternatively, the scan line G1 may be a wiring formed using a conductive film that can be formed in the same steps as the first electrode of the sensing element C. For example, first electrodes of the sensing elements C in the sensing units 10UB adjacent in the row direction can be connected to each other and used as the scan line G1.

The sensing unit 10UB includes the first transistor M1 in which the gate is electrically connected to the second electrode of the sensing element C and the first electrode is electrically connected to the wiring VPI (FIG. 8B).

The sensing unit 10UB may include the third transistor M3 in which the gate is electrically connected to a wiring RES, the first electrode is electrically connected to the second electrode of the sensing element C, and the second electrode is electrically connected to the wiring VRES.

A method for driving the touch sensor of one embodiment of the present invention will be described.

<<First Step>>

In a first step, a reset signal for turning on the third transistor M3 and subsequently turning off the third transistor M3 is supplied to the gate of the third transistor M3, and a potential of the second electrode of the sensing element C is set at a predetermined potential (see Period T1 in FIG. 8C).

Specifically, a reset signal is supplied from the wiring RES. The third transistor M3 supplied with the reset signal makes the node A have a potential capable of turning on the first transistor M1, for example (FIG. 8B).

<<Second Step>>

In a second step, a selection signal is supplied to the first electrode of the sensing element C, and a potential that varies depending on the selection signal and the capacitance of the sensing element C is supplied to the gate of the first transistor M1 (see Period T2 in FIG. 8C).

Specifically, a rectangular selection signal is supplied from the scan line G1($i$−1). The sensing element C having the first electrode supplied with the rectangular selection signal increases the potential of the node A depending on the capacitance of the sensing element C.

For example, when the sensing element C is placed in the air and an object with a higher dielectric constant than the air comes close to the first electrode of the sensing element C, the apparent capacitance of the sensing element C increases.

Consequently, a change in the potential of the node A due to a rectangular selection signal is smaller than that when an object with a higher dielectric constant than the air is not placed close to the first electrode of the sensing element C.

<<Third Step>>

In a third step, a signal based on a change in the gate potential of the first transistor M1 is supplied to the signal line DL.

For example, a current that is changed based on a change in the gate potential of the first transistor M1 is supplied to the signal line DL.

The converter CONV converts a change in current flowing through the signal line DL into a change in voltage, and the terminal OUT outputs the voltage.

The first to third steps are repeated for every row of the scan lines G1(1) to G1($n$) (see Periods T2 to T4 in FIG. 8C).

This embodiment can be combined with any other embodiment as appropriate.

Embodiment 4

In this embodiment, a display panel of one embodiment of the present invention and a method for manufacturing the display panel will be described.

An example of a light-emitting device using an organic EL element will be described below; the light-emitting device can be used as the display panel of one embodiment of the present invention.

Specific Example 1

Figure 9A:
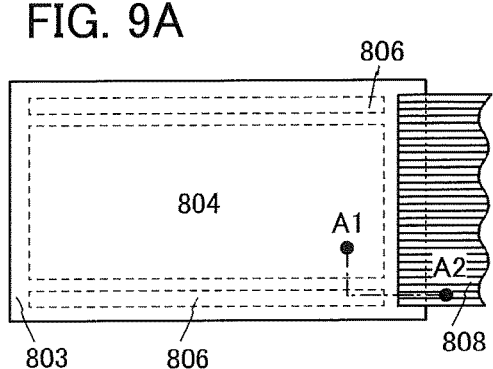
FIGS. 9A to 9D illustrate examples of a light-emitting device of one embodiment of the present invention.

FIG. 9A is a plan view of a light-emitting device. FIG. 9C is an example of a cross-sectional view along dashed-dotted line A1-A2 in FIG. 9A. The light-emitting device in Specific Example 1 is a top-emission light-emitting device using a color filter method. In this embodiment, the light-emitting device can have a structure in which subpixels of three colors of red (R), green (G), and blue (B), for example, express one color; a structure in which subpixels of four colors of R, G, B, and white (W) express one color; a structure in which subpixels of four colors of R, G, B, and yellow (Y) express one color; or the like. There is no particular limitation on color elements, and colors other than R, G, B, W, and Y may be used. For example, cyan or magenta may be used.

The light-emitting device illustrated in FIG. 9A includes a light-emitting portion 804, a driver circuit portion 806, and an FPC 808. Light-emitting elements and transistors in the light-emitting portion 804 and the driver circuit portion 806 are sealed with a substrate 801, a substrate 803, and a bonding layer 823.

The light-emitting device in FIG. 9C includes the substrate 801, a bonding layer 811, an insulating layer 813, a plurality of transistors, the conductive layer 857, the insulating layer 815, an insulating layer 817, a plurality of light-emitting elements, the insulating layer 821, the bonding layer 823, the overcoat 849, the coloring layer 845, the light-blocking layer 847, an insulating layer 843, a bonding layer 841, and the substrate 803. The bonding layer 823, the overcoat 849, the insulating layer 843, the bonding layer 841, and the substrate 803 transmit visible light.

In the light-emitting portion 804, a transistor 820 and a light-emitting element 830 are provided over the substrate 801 with the bonding layer 811 and the insulating layer 813 placed therebetween. The light-emitting element 830 includes a lower electrode 831 over the insulating layer 817, an EL layer 833 over the lower electrode 831, and an upper electrode 835 over the EL layer 833. The lower electrode 831 is electrically connected to a source electrode or a drain electrode of the transistor 820. An end portion of the lower electrode 831 is covered with the insulating layer 821. The lower electrode 831 preferably reflects visible light. The upper electrode 835 transmits visible light.

In the light-emitting portion 804, the coloring layer 845 overlapping the light-emitting element 830 and the light-blocking layer 847 overlapping the insulating layer 821 are provided. The coloring layer 845 and the light-blocking layer 847 are covered with the overcoat 849. The space between the light-emitting element 830 and the overcoat 849 is filled with the bonding layer 823.

The insulating layer 815 has an effect of preventing diffusion of impurities into a semiconductor included in the transistor. As the insulating layer 817, an insulating layer having a planarization function is preferably used in order to reduce surface unevenness due to the transistor.

In the driver circuit portion 806, a plurality of transistors are provided over the substrate 801 with the bonding layer 811 and the insulating layer 813 positioned therebetween. FIG. 9C illustrates one of the transistors included in the driver circuit portion 806.

The insulating layer 813 and the substrate 801 are attached with the bonding layer 811. The insulating layer 843 and the substrate 803 are attached with the bonding layer 841. The insulating layer 813 and the insulating layer 843 are preferably highly resistant to moisture, in which case impurities such as water can be prevented from entering the light-emitting element 830 or the transistor 820, leading to higher reliability of the light-emitting device.

The conductive layer 857 is electrically connected to an external input terminal through which a signal (e.g., a video signal, a clock signal, a start signal, or a reset signal) or a potential from the outside is transmitted to the driver circuit portion 806. Here, an example in which the FPC 808 is provided as the external input terminal is described. To prevent an increase in the number of fabrication steps, the conductive layer 857 is preferably formed using the same material and the same step as those of the electrode or the wiring in the light-emitting portion or the driver circuit portion. Here, an example is described in which the conductive layer 857 is formed using the same material and the same step as those of the electrodes of the transistor 820.

In the light-emitting device in FIG. 9C, the FPC 808 is positioned over the substrate 803. The connector 825 is connected to the conductive layer 857 through an opening provided in the substrate 803, the bonding layer 841, the insulating layer 843, the bonding layer 823, the insulating layer 817, and the insulating layer 815. Furthermore, the connector 825 is connected to the FPC 808. That is, the FPC 808 and the conductive layer 857 are electrically connected to each other through the connector 825. When the conductive layer 857 and the substrate 803 overlap with each other, an opening formed in the substrate 803 (or the use of a substrate with an opening) allows the conductive layer 857, the connector 825, and the FPC 808 to be electrically connected to each other.

Specific Example 2

Figure 9B:
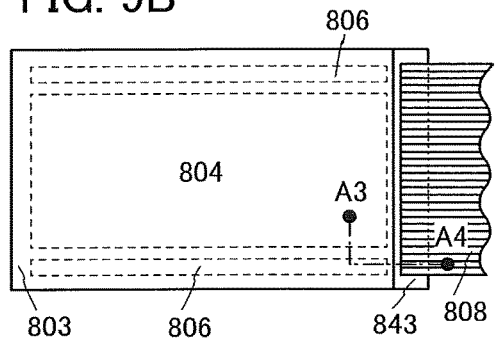
Figure 9C:
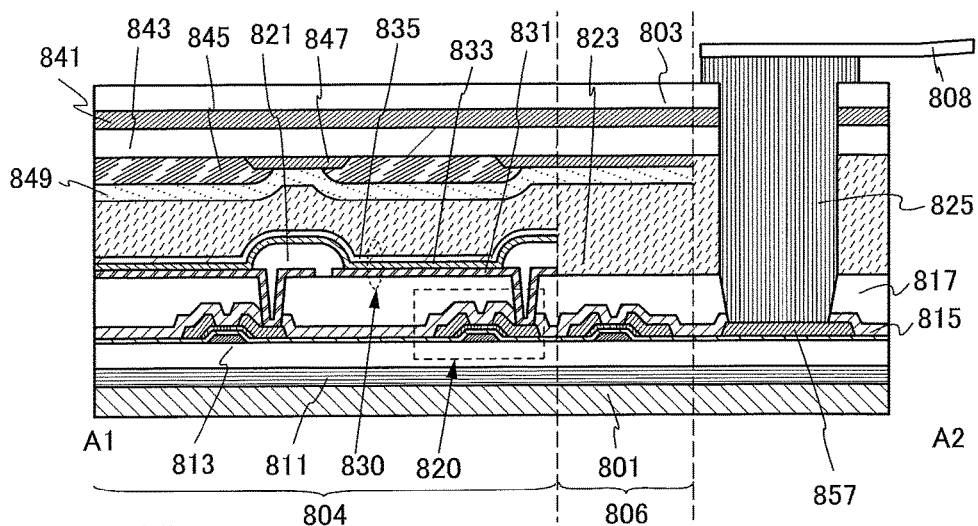
Figure 9D:
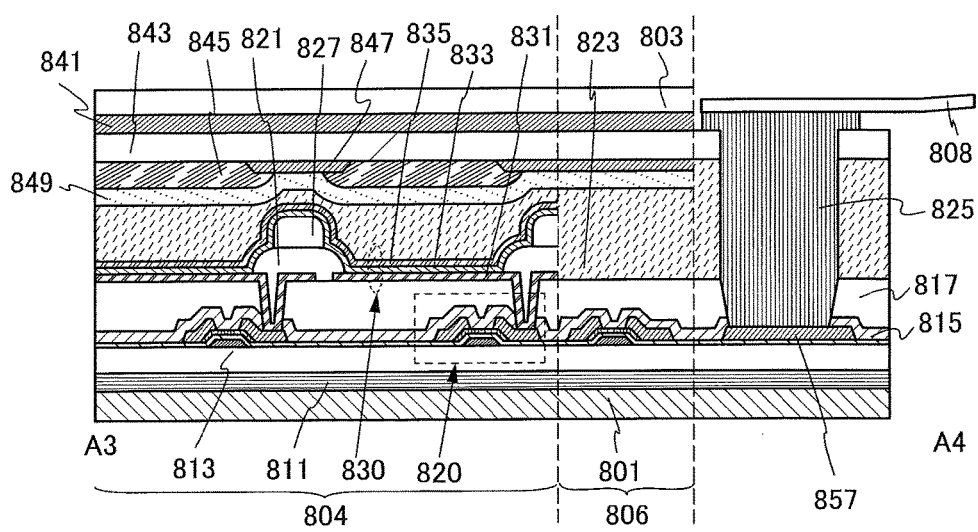

FIG. 9B is a plan view of a light-emitting device. FIG. 9D is an example of a cross-sectional view along dashed-dotted line A3-A4 in FIG. 9B. The light-emitting device in Specific Example 2 is a top-emission light-emitting device using a color filter method, which is different from that in Specific Example 1. Here, the difference from Specific Example 1 is described in detail, and description of the same points is omitted.

The light-emitting device illustrated in FIG. 9D is different from that in FIG. 9C in the following respects.

The light-emitting device in FIG. 9D includes the spacer 827 over the insulating layer 821. The spacer 827 can adjust the space between the substrate 801 and the substrate 803.

In the light-emitting device in FIG. 9D, the substrate 801 and the substrate 803 have different sizes. The FPC 808 is positioned over the insulating layer 843 and does not overlap the substrate 803. The connector 825 is connected to the conductive layer 857 through an opening provided in the insulating layer 843, the bonding layer 823, the insulating layer 817, and the insulating layer 815. There is no limitation on the material for the substrate 803 because an opening does not need to be provided in the substrate 803.

Specific Example 3

Figure 10A:
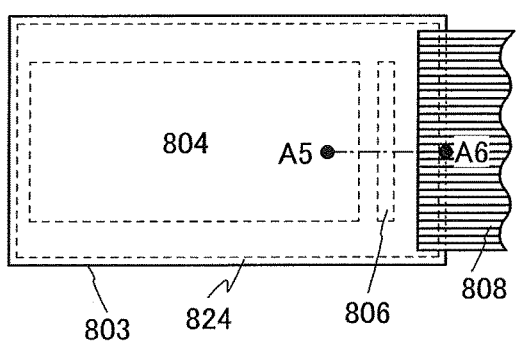
FIGS. 10A to 10E illustrate examples of a light-emitting device of one embodiment of the present invention.

FIG. 10A is a plan view of a light-emitting device. FIG. 10C is an example of a cross-sectional view along dashed-dotted line A5-A6 in FIG. 10A. The light-emitting device in Specific Example 3 is a top-emission light-emitting device using a separate coloring method.

The light-emitting device illustrated in FIG. 10A includes the light-emitting portion 804, the driver circuit portion 806, and the FPC 808. Light-emitting elements and transistors in the light-emitting portion 804 and the driver circuit portion 806 are sealed with the substrate 801, the substrate 803, a frame-shaped bonding layer 824, and the bonding layer 823.

The light-emitting device in FIG. 10C includes the substrate 801, the bonding layer 811, the insulating layer 813, a plurality of transistors, the conductive layer 857, the insulating layer 815, the insulating layer 817, a plurality of light-emitting elements, the insulating layer 821, the bonding layer 823, the frame-shaped bonding layer 824, and the substrate 803. The bonding layer 823 and the substrate 803 transmit visible light.

It is preferable that the frame-shaped bonding layer 824 be more moisture-resistant than the bonding layer 823, in which case impurities such as moisture can be prevented from entering the light-emitting device from the outside. Thus, the light-emitting device can have high reliability.

In Specific Example 3, light emitted from the light-emitting element 830 is extracted from the light-emitting device through the bonding layer 823. Therefore, the bonding layer 823 preferably has a higher light-transmitting property than the frame-shaped bonding layer 824. The bonding layer 823 preferably has a higher refractive index than the frame-shaped bonding layer 824. Moreover, the volume of the bonding layer 823 is preferably less reduced by curing than that of the frame-shaped bonding layer 824.

In the light-emitting portion 804, the transistor 820 and the light-emitting element 830 are provided over the substrate 801 with the bonding layer 811 and the insulating layer 813 placed therebetween. The light-emitting element 830 includes the lower electrode 831 over the insulating layer 817, the EL layer 833 over the lower electrode 831, and the upper electrode 835 over the EL layer 833. The lower electrode 831 is electrically connected to the source electrode or the drain electrode of the transistor 820. An end portion of the lower electrode 831 is covered with the insulating layer 821. The lower electrode 831 preferably reflects visible light. The upper electrode 835 transmits visible light.

In the driver circuit portion 806, a plurality of transistors are provided over the substrate 801 with the bonding layer 811 and the insulating layer 813 positioned therebetween. FIG. 10C illustrates one of the transistors in the driver circuit portion 806.

The insulating layer 813 and the substrate 801 are attached with the bonding layer 811. The insulating layer 813 is preferably highly resistant to moisture, in which case impurities such as water can be prevented from entering the light-emitting element 830 or the transistor 820, leading to higher reliability of the light-emitting device.

The conductive layer 857 is electrically connected to an external input terminal through which a signal or a potential from the outside is transmitted to the driver circuit portion 806. In this example, the FPC 808 is provided as the external input terminal, and the conductive layer 857 is formed using the same material and the same step as those of the electrodes of the transistor 820.

In the light-emitting device in FIG. 10C, the FPC 808 is positioned over the substrate 803. The connector 825 is connected to the conductive layer 857 through an opening provided in the substrate 803, the bonding layer 823, the insulating layer 817, and the insulating layer 815. The connector 825 is also connected to the FPC 808. That is, the FPC 808 and the conductive layer 857 are electrically connected to each other through the connector 825.

Specific Example 4

Figure 10B:
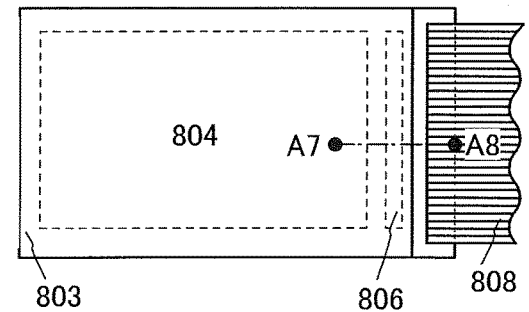
Figure 10C:
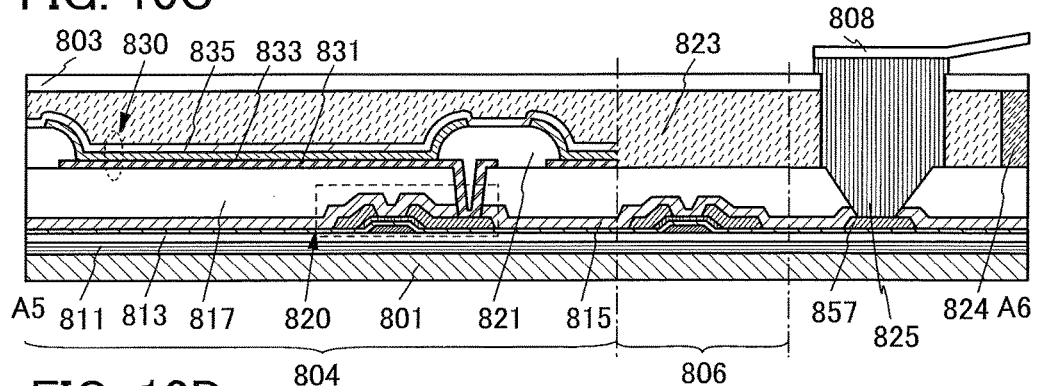
Figure 10D:
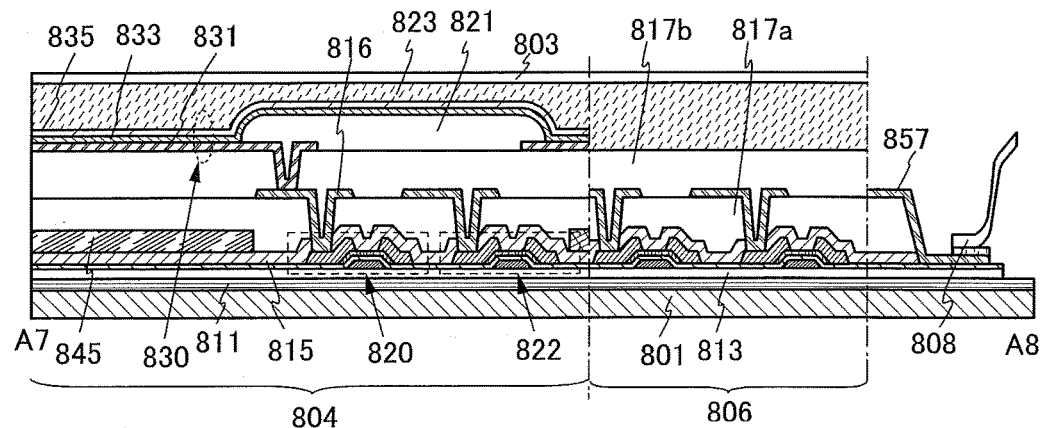

FIG. 10B is a plan view of a light-emitting device. FIG. 10D is an example of a cross-sectional view along dashed-dotted line A7-A8 in FIG. 10B. The light-emitting device in Specific Example 4 is a bottom-emission light-emitting device using a color filter method.

The light-emitting device illustrated in FIG. 1 OD includes the substrate 801, the bonding layer 811, the insulating layer 813, a plurality of transistors, the conductive layer 857, the insulating layer 815, the coloring layer 845, the insulating layer 817a, the insulating layer 817b, the conductive layer 816, a plurality of light-emitting elements, the insulating layer 821, the bonding layer 823, and the substrate 803. The substrate 801, the bonding layer 811, the insulating layer 813, the insulating layer 815, the insulating layer 817a, and the insulating layer 817b transmit visible light.

In the light-emitting portion 804, the transistor 820, a transistor 822, and the light-emitting element 830 are provided over the substrate 801 with the bonding layer 811 and the insulating layer 813 positioned therebetween. The light-emitting element 830 includes the lower electrode 831 over the insulating layer 817b, the EL layer 833 over the lower electrode 831, and the upper electrode 835 over the EL layer 833. The lower electrode 831 is electrically connected to the source electrode or the drain electrode of the transistor 820. An end portion of the lower electrode 831 is covered with the insulating layer 821. The upper electrode 835 preferably reflects visible light. The lower electrode 831 transmits visible light. There is no particular limitation on the position of the coloring layer 845 overlapping with the light-emitting element 830; for example, the coloring layer 845 may be provided between the insulating layer 817a and the insulating layer 817b or between the insulating layer 815 and the insulating layer 817a.

In the driver circuit portion 806, a plurality of transistors are provided over the substrate 801 with the bonding layer 811 and the insulating layer 813 positioned therebetween. FIG. 10D illustrates two of the transistors in the driver circuit portion 806.

The insulating layer 813 and the substrate 801 are attached with the bonding layer 811. The insulating layer 813 is preferably highly resistant to moisture, in which case impurities such as water can be prevented from entering the light-emitting element 830 or the transistors 820 and 822, leading to higher reliability of the light-emitting device.

The conductive layer 857 is electrically connected to an external input terminal through which a signal or a potential from the outside is transmitted to the driver circuit portion 806. In this example, the FPC 808 is provided as the external input terminal, and the conductive layer 857 is formed using the same material and the same step as those of the conductive layer 816.

Specific Example 5

Figure 10E:
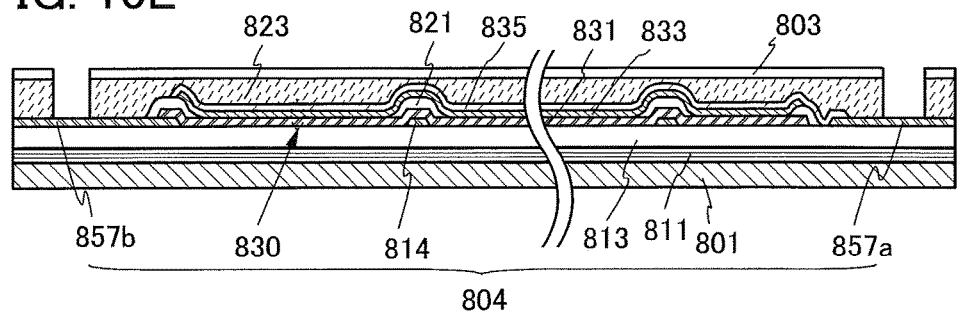

FIG. 10E illustrates an example of a light-emitting device different from those in Specific Examples 1 to 4.

The light-emitting device in FIG. 10E includes the substrate 801, the bonding layer 811, the insulating layer 813, a conductive layer 814, a conductive layer 857a, a conductive layer 857b, the light-emitting element 830, the insulating layer 821, the bonding layer 823, and the substrate 803.

The conductive layer 857a and the conductive layer 857b serve as external connection electrodes of the light-emitting device and can each be electrically connected to an FPC or the like.

The light-emitting element 830 includes the lower electrode 831, the EL layer 833, and the upper electrode 835. An end portion of the lower electrode 831 is covered with the insulating layer 821. The light-emitting element 830 has a bottom-emission structure, a top-emission structure, or a dual-emission structure. The electrode, substrate, insulating layer, and the like through which light is extracted transmit visible light. The conductive layer 814 is electrically connected to the lower electrode 831.

The substrate through which light is extracted may have, as a light extraction structure, a hemispherical lens, a micro lens array, a film provided with an uneven surface structure, a light diffusing film, or the like. For example, the substrate with the light extraction structure can be formed by bonding the above lens or film to a resin substrate with an adhesive or the like having substantially the same refractive index as the substrate, the lens, or the film.

The conductive layer 814 is preferably, though not necessarily, provided because voltage drop due to the resistance of the lower electrode 831 can be inhibited. In addition, for a similar purpose, a conductive layer electrically connected to the upper electrode 835 may be provided over the insulating layer 821, the EL layer 833, the upper electrode 835, or the like.

The conductive layer 814 can be a single layer or a stacked layer formed using a material selected from copper, titanium, tantalum, tungsten, molybdenum, chromium, neodymium, scandium, nickel, and aluminum, an alloy material containing any of these materials as its main component, and the like. The thickness of the conductive layer 814 can range from 0.1 μm to 3 μm, for example, and ranges preferably from 0.1 μm to 0.5 μm.

<Examples of Materials>

Next, materials that can be used for the light-emitting device will be described. Note that description of the components already described in this specification is omitted in some cases.

For the substrates, glass, quartz, an organic resin, a metal, an alloy, or the like can be used. The substrate through which light from the light-emitting element is extracted is formed using a material that transmits the light.

It is particularly preferable to use a flexible substrate. For example, it is possible to use glass, a metal, or an alloy that is thin enough to have flexibility, or an organic resin.

An organic resin, which has a smaller specific gravity than glass, is preferably used for the flexible substrate, in which case the light-emitting device can be lighter in weight than that using glass.

A material with high toughness is preferably used for the substrates. In that case, a robust light-emitting device with high impact resistance can be provided. For example, when an organic resin substrate or a metal or alloy substrate with a small thickness is used, the light-emitting device can be lighter in weight and more robust than that using a glass substrate.

A metal material and an alloy material, which have high thermal conductivity, are preferred because they can easily conduct heat to the whole substrate and accordingly can prevent a local temperature rise in the light-emitting device. The thickness of a substrate using a metal material or an alloy material ranges preferably from 10 μm to 200 μm, more preferably from 20 μm to 50 μm.

Although there is no particular limitation on a material for the metal substrate and the alloy substrate, it is preferable to use, for example, aluminum, copper, nickel, or a metal alloy such as an aluminum alloy or stainless steel.

Furthermore, when a material with high thermal emissivity is used for the substrate, the surface temperature of the light-emitting device can be prevented from rising, leading to prevention of breakage or a decrease in reliability of the light-emitting device. For example, the substrate may have a stacked-layer structure of a metal substrate and a layer with high thermal emissivity (e.g., a layer formed using a metal oxide or a ceramic material).

Examples of a material having flexibility and a light-transmitting property include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, a material with a low coefficient of thermal expansion is preferred, and for example, a polyamide imide resin, a polyimide resin, or PET can be suitably used. It is also possible to use a substrate in which a fibrous body is impregnated with a resin (also referred to as prepreg) or a substrate whose coefficient of thermal expansion is reduced by mixing an organic resin with an inorganic filler.

The flexible substrate may have a stacked-layer structure in which a hard coat layer by which a surface of the device is protected from damage (e.g., a silicon nitride layer), a layer that can disperse pressure (e.g., an aramid resin layer), or the like is stacked over a layer of any of the above-mentioned materials.

The flexible substrate may be formed by stacking a plurality of layers. When a glass layer is used, a barrier property against water and oxygen can be improved and thus a reliable light-emitting device can be provided.

For example, it is possible to use a flexible substrate in which a glass layer, a bonding layer, and an organic resin layer are stacked from the side closer to a light-emitting element. The thickness of the glass layer ranges from 20 µm to 200 µm, preferably from 25 µm to 100 µm. With such a thickness, the glass layer can have both high flexibility and a high barrier property against water and oxygen. The thickness of the organic resin layer ranges from 10 µm to 200 µm, preferably from 20 µm to 50 µm. Providing such an organic resin layer outside the glass layer, occurrence of a crack or a break in the glass layer can be suppressed and mechanical strength can be improved. With the substrate using such a composite material of a glass material and an organic resin, a flexible light-emitting device with high reliability can be provided.

For the bonding layer, various curable adhesives such as a photo curable adhesive (e.g., an ultraviolet curable adhesive), a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. A material with low moisture permeability, such as an epoxy resin, is particularly preferred. Alternatively, a two-component resin may be used. An adhesive sheet or the like may be used.

Furthermore, the resin may include a drying agent. For example, it is possible to use a substance that adsorbs moisture by chemical adsorption, such as oxide of an alkaline earth metal (e.g., calcium oxide or barium oxide). Alternatively, it is possible to use a substance that adsorbs moisture by physical adsorption, such as zeolite or silica gel. The drying agent is preferably included because it can prevent impurities such as moisture from entering the functional element, thereby improving the reliability of the light-emitting device.

When a filler with a high refractive index or a light scattering member is mixed into the resin, the efficiency of light extraction from the light-emitting element can be improved. For example, titanium oxide, barium oxide, zeolite, or zirconium can be used.

There is no particular limitation on the structure of the transistors in the light-emitting device. The transistors may have a structure similar to that of the transistor used in the active matrix touch sensor described in Embodiment 1. For example, a forward staggered transistor or an inverted staggered transistor may be used. A top-gate transistor or a bottom-gate transistor may be used. There is no particular limitation on a semiconductor material used for the transistors, and silicon or germanium can be used, for example. Alternatively, an oxide semiconductor containing at least one of indium, gallium, and zinc (e.g., In—Ga—Zn-based metal oxide) may be used.

There is no particular limitation on the crystallinity of a semiconductor material used for the transistors, and an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of the transistor characteristics can be suppressed.

For stable characteristics of the transistor, a base film is preferably provided. The base film can be formed with a single-layer structure or a stacked-layer structure using an inorganic insulating film such as a silicon oxide film, a silicon nitride film, a silicon oxynitride film, or a silicon nitride oxide film. The base film can be formed by sputtering, chemical vapor deposition (CVD) such as a plasma-enhanced CVD, thermal CVD, or metal organic CVD (MOCVD), atomic layer deposition (ALD), coating, printing, or the like. Note that the base film is not necessarily provided if not necessary. In each of the above structural examples, the insulating layer 813 can serve as a base film of the transistor.

As the light-emitting element, a self-luminous element can be used, and an element whose luminance is controlled by current or voltage is included in the category of the light-emitting element. For example, a light-emitting diode (LED), an organic EL element, or an inorganic EL element can be used.

The light-emitting element can have any of a top-emission structure, a bottom-emission structure, and a dual-emission structure. A conductive film that transmits visible light is used as the electrode through which light is extracted. A conductive film that reflects visible light is preferably used as the electrode through which light is not extracted.

The conductive film that transmits visible light can be formed using, for example, indium oxide, indium tin oxide (ITO), indium zinc oxide, zinc oxide, or zinc oxide to which gallium is added. It is also possible to use a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) when the film is thin enough to have a light-transmitting property. Alternatively, a stack of any of the above materials can be used as the conductive film. For example, a stacked film of ITO and an alloy of silver and magnesium is preferably used, in which case conductivity can be increased. Further alternatively, graphene or the like may be used.

For the conductive film that reflects visible light, a metal material such as aluminum, gold, platinum, silver, nickel, tungsten, chromium, molybdenum, iron, cobalt, copper, or palladium or an alloy containing any of these metal materials can be used, for example. Lanthanum, neodymium, germanium, or the like may be added to the metal material or the alloy. Moreover, the conductive film can be formed using an alloy containing aluminum (an aluminum alloy) such as an alloy of aluminum and titanium, an alloy of aluminum and nickel, or an alloy of aluminum and neodymium; or an alloy containing silver such as an alloy of silver and copper, an alloy of silver, copper, and palladium, or an alloy of silver and magnesium. An alloy of silver and copper is preferable because of its high heat resistance. When a metal film or a metal oxide film is stacked on an aluminum alloy film, oxidation of the aluminum alloy film can be suppressed. Examples of a material for the metal film or the metal oxide film are titanium and titanium oxide. Alternatively, the conductive film having a property of transmitting visible light and a film containing any of the above metal materials may be stacked. For example, it is possible to use a stacked film of silver and ITO or a stacked film of an alloy of silver and magnesium and ITO.

Each of the electrodes can be formed by an evaporation method or a sputtering method. Alternatively, a discharging method such as an ink-jet method, a printing method such as a screen printing method, or a plating method can be used.

When a voltage higher than the threshold voltage of the light-emitting element is applied between the lower electrode 831 and the upper electrode 835, holes are injected to the EL layer 833 from the anode side and electrons are injected to the EL layer 833 from the cathode side. The injected electrons and holes are recombined in the EL layer 833 and a light-emitting substance contained in the EL layer 833 emits light.

The EL layer 833 includes at least a light-emitting layer. In addition to the light-emitting layer, the EL layer 833 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron-transport property and a high hole-transport property), and the like.

For the EL layer 833, either a low molecular compound or a high molecular compound can be used, and an inorganic compound may be used. Each of the layers included in the EL layer 833 can be formed by any of the following methods: an evaporation method (including a vacuum evaporation method), a transfer method, a printing method, an ink-jet method, a coating method, and the like.

The light-emitting element is preferably provided between a pair of insulating films that are highly resistant to moisture, in which case impurities such as water can be prevented from entering the light-emitting element, thereby preventing a decrease in the reliability of the light-emitting device.

Examples of the insulating film highly resistant to moisture include a film containing nitrogen and silicon (e.g., a silicon nitride film and a silicon nitride oxide film) and a film containing nitrogen and aluminum (e.g., an aluminum nitride film). Alternatively, a silicon oxide film, a silicon oxynitride film, an aluminum oxide film, or the like may be used.

For example, the moisture vapor transmission rate of the insulating film highly resistant to moisture is lower than or equal to $1\times10^{-5}$ [g/(m$^2$·day)], preferably lower than or equal to $1\times10^{-6}$ [g/(m$^2$·day)], further preferably lower than or equal to $1\times10^{-7}$ [g/(m$^2$·day)], still further preferably lower than or equal to $1\times10^{-8}$ [g/(m$^2$·day)].

Insulating films highly resistant to moisture are preferably used as the insulating layer 813 and the insulating layer 843.

As the insulating layer 815, an inorganic insulating film such as a silicon oxide film, a silicon oxynitride film, or an aluminum oxide film can be used, for example. For the insulating layers 817, 817a, and 817b, an organic material such as polyimide, acrylic, polyamide, polyimide amide, or a benzocyclobutene-based resin can be used, for example. Alternatively, a low dielectric constant material (low-k material) or the like can be used. Furthermore, each of the insulating layers may be formed by stacking a plurality of insulating films.

The insulating layer 821 is formed using an organic insulating material or an inorganic insulating material. As a resin, a polyimide resin, a polyamide resin, an acrylic resin, a siloxane resin, an epoxy resin, or a phenol resin can be used, for example. It is particularly preferable that the insulating layer 821 be formed to have an inclined sidewall with continuous curvature by using a photosensitive resin material.

There is no particular limitation on the method for forming the insulating layer 821. A photolithography method, a sputtering method, an evaporation method, a droplet discharging method (e.g., an ink-jet method), a printing method (e.g., screen printing or off-set printing), or the like may be used.

The spacer 827 can be formed using an inorganic insulating material, an organic insulating material, a metal material, or the like. As the inorganic insulating material and the organic insulating material, a variety of materials that can be used for the aforementioned insulating layers can be used, for example. As the metal material, titanium, aluminum, or the like can be used. When the spacer 827 containing a conductive material and the upper electrode 835 are electrically connected to each other, a potential drop due to the resistance of the upper electrode 835 can be suppressed. The spacer 827 may have a tapered shape or an inverse tapered shape.

A conductive layer functioning as an electrode of the transistor, a wiring, an auxiliary wiring of the light-emitting element, or the like in the light-emitting device can be formed with a single-layer structure or a stacked-layer structure using any of metal materials such as molybdenum, titanium, chromium, tantalum, tungsten, aluminum, copper, neodymium, and scandium and an alloy material containing any of these elements, for example. The conductive layer may be formed using a conductive metal oxide such as indium oxide (e.g., $In_2O_3$), tin oxide (e.g., $SnO_2$), zinc oxide (ZnO), ITO, indium zinc oxide (e.g., $In_2O_3$—Zno), or any of these metal oxide materials containing silicon oxide.

The coloring layer 845 is a colored layer that transmits light in a specific wavelength range. For example, a red (R) color filter for transmitting light in a red wavelength range, a green (G) color filter for transmitting light in a green wavelength range, and a blue (B) color filter for transmitting light in a blue wavelength range can be used. Each coloring layer is formed in a desired position with any of various materials by a printing method, an ink-jet method, an etching method using photolithography, or the like.

The light-blocking layer 847 is provided between adjacent coloring layers. The light-blocking layer blocks light emitted from an adjacent light-emitting element to prevent color mixture between adjacent light-emitting elements. Here, the coloring layer is provided such that its end portion overlaps with the light-blocking layer, whereby light leakage can be reduced. For the light-blocking layer, a material that blocks light from the light-emitting element can be used; for example, a black matrix may be formed using a metal material or a resin material containing pigment or dye. Note that it is preferable to provide the light-blocking layer in a region other than the light-emitting portion, such as a driver circuit portion, in which case undesired leakage of guided light or the like can be suppressed.

The overcoat 849 covering the coloring layer and the light-blocking layer may be provided. The overcoat can prevent impurities and the like contained in the coloring layer from being diffused into the light-emitting element. The overcoat is formed with a material that transmits light emitted from the light-emitting element; for example, it is possible to use an inorganic insulating film such as a silicon nitride film or a silicon oxide film, an organic insulating film such as an acrylic film or a polyimide film, or a stacked layer of an organic insulating film and an inorganic insulating film.

In the case where upper surfaces of the coloring layer and the light-blocking layer are coated with a material of the bonding layer, a material that has high wettability with respect to the material of the bonding layer is preferably used as the material of the overcoat. For example, the overcoat is preferably an oxide conductive film such as an ITO film or a metal film such as an Ag film that is thin enough to transmit light.

For the connector 825, it is possible to use a paste-like or sheet-like material that is obtained by mixing metal particles into a thermosetting resin and exhibits anisotropic electrical conductivity by thermocompression bonding. As the metal particles, particles in which two or more kinds of metals are layered, for example, nickel particles coated with gold are preferably used.

<Method for Manufacturing Display Panel>

Next, the description is made on an example of a method for manufacturing the display panel of one embodiment of the present invention, here, the top-emission light-emitting device using a color filter method in FIGS. 9A and 9C (Specific Example 1).

Figure 11A:
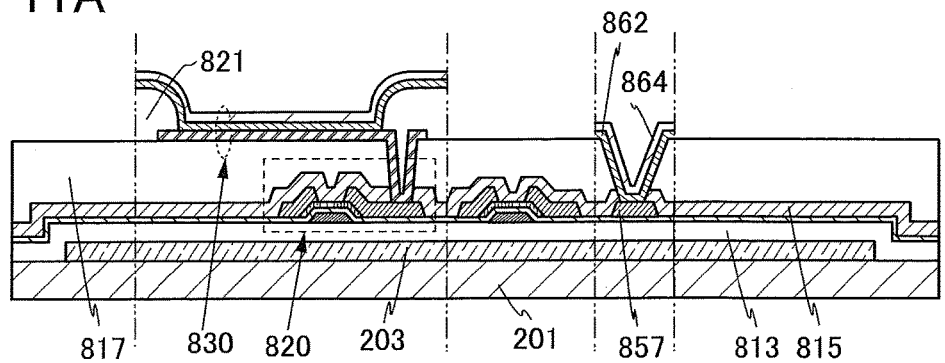
FIGS. 11A to 11C illustrate an example of a method for fabricating a light-emitting device of one embodiment of the present invention.

First, as illustrated in FIG. 11A, a separation layer 203 is formed over a formation substrate 201, and the insulating layer 813 is formed over the separation layer 203. Next, a plurality of transistors (the transistor 820 and the like), the conductive layer 857, the insulating layer 815, the insulating layer 817, a plurality of light-emitting elements (the light-emitting element 830 and the like), and the insulating layer 821 are formed over the insulating layer 813. An opening is formed in the insulating layers 821, 817, and 815 to expose the conductive layer 857. Here, an EL layer 862 is formed over the exposed conductive layer 857 using the same material and the same step as the EL layer of the light-emitting element, and a conductive layer 864 is formed over the EL layer 862 using the same material and the same step as the upper electrode of the light-emitting element. Note that the EL layer 862 and the conductive layer 864 are not necessarily provided. Here, the insulating layer 813, the light-emitting element, and the components therebetween are collectively referred to as a peeled layer.

Although an example in which the separation layer is formed to have an island shape is described here, one embodiment of the present invention is not limited to this example. In this step, the material of the separation layer is selected such that separation occurs at the interface between the formation substrate 201 and the separation layer 203, at the interface between the separation layer 203 and the peeled layer, or in the separation layer 203 when the peeled layer is separated from the formation substrate 201. This embodiment shows an example in which separation occurs at the interface between the peeled layer and the separation layer 203; however, separation may occur elsewhere depending on the combination of materials used for the separation layer 203 and the peeled layer. Note that in the case where the peeled layer has a stacked-layer structure, a layer in contact with the separation layer 203 is referred to as a first layer.

In the case where the separation layer 203 has a stacked-layer structure of a tungsten film and a tungsten oxide film, for example, part of the separation layer 203 (here, the tungsten oxide film) may remain on the peeled layer side when separation occurs at the interface between the tungsten film and the tungsten oxide film (or the vicinity of the interface). The separation layer 203 remaining on the peeled layer side may be removed after separation.

As the formation substrate 201, a substrate having at least heat resistance high enough to withstand process temperature in a manufacturing process is used. For example, the formation substrate 201 can be a glass substrate, a quartz substrate, a sapphire substrate, a semiconductor substrate, a ceramic substrate, a metal substrate, a resin substrate, or a plastic substrate.

When a glass substrate is used as the formation substrate 201, an insulating film such as a silicon oxide film, a silicon oxynitride film, a silicon nitride film, or a silicon nitride oxide film is preferably formed as a base film between the formation substrate 201 and the separation layer 203, in which case contamination from the glass substrate can be prevented.

The separation layer 203 can be formed using an element selected from tungsten, molybdenum, titanium, tantalum, niobium, nickel, cobalt, zirconium, zinc, ruthenium, rhodium, palladium, osmium, iridium, and silicon; an alloy material containing any of the elements; a compound material containing any of the elements; and the like. A crystal structure of a layer containing silicon may be amorphous, microcrystal, or polycrystal. Furthermore, metal oxide such as aluminum oxide, gallium oxide, zinc oxide, titanium dioxide, indium oxide, indium tin oxide, indium zinc oxide, or In—Ga—Zn oxide may be used. The separation layer 203 is preferably formed using a high-melting point metal material such as tungsten, titanium, or molybdenum, in which case the degree of freedom of the process for forming the peeled layer can be increased.

The separation layer 203 can be formed by, for example, a sputtering method, a plasma-enhanced CVD method, a coating method (including a spin coating method, a droplet discharging method, and a dispensing method), or a printing method. The thickness of the separation layer 203 ranges from 10 nm to 200 nm, for example, and preferably from 20 nm to 100 nm.

When the separation layer 203 has a single-layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum may be formed. Note that a mixture of tungsten and molybdenum is an alloy of tungsten and molybdenum, for example.

When the separation layer 203 has a stacked-layer structure including a layer containing tungsten and a layer containing an oxide of tungsten, the layer containing an oxide of tungsten may be formed as follows: the layer containing tungsten is formed first and an insulating film formed of an oxide is formed thereover, so that the layer containing an oxide of tungsten is formed at the interface between the tungsten layer and the insulating film. Alternatively, the layer containing an oxide of tungsten may be formed by performing thermal oxidation treatment, oxygen plasma treatment, nitrous oxide ($N_2O$) plasma treatment, treatment with a highly oxidizing solution such as ozone water, or the like on the surface of the layer containing tungsten. Plasma treatment or heat treatment may be performed in an atmosphere of oxygen, nitrogen, or nitrous oxide alone, or a mixed gas of any of these gasses and another gas. Surface condition of the separation layer 203 is changed by the plasma treatment or heat treatment, whereby adhesion between the separation layer 203 and an insulating layer formed later can be controlled.

Note that the separation layer is not necessarily provided when separation at an interface between the formation substrate and the peeled layer is possible. For example, a glass substrate is used as the formation substrate, and an organic resin such as polyimide, polyester, polyolefin, polyamide, polycarbonate, or acrylic is formed in contact with the glass substrate. Next, adhesion between the formation substrate and the organic resin is improved by laser light irradiation or heat treatment. Then, an insulating film, a transistor, and the like are formed over the organic resin. After that, separation at the interface between the formation substrate and the organic resin can be caused by performing laser light irradiation with higher energy density than the previous laser light irradiation or performing heat treatment at a higher temperature than the previous heat treatment. Moreover, the interface between the formation substrate and the organic resin may be soaked in a liquid to perform separation.

Since the insulating film, the transistor, and the like are formed over the organic resin having low heat resistance in the above method, it is impossible to expose the substrate to high temperatures in the manufacturing process. Note that a transistor using an oxide semiconductor is not necessarily processed at high temperatures and thus can be favorably formed over the organic resin.

The organic resin may be used for a substrate of the device. Alternatively, the organic resin may be removed and another substrate may be attached to an exposed surface of the peeled layer using an adhesive.

Alternatively, separation at the interface between a metal layer and the organic resin may be performed in the following manner the metal layer is provided between the formation substrate and the organic resin and current is made to flow in the metal layer so that the metal layer is heated.

Figure 11B:
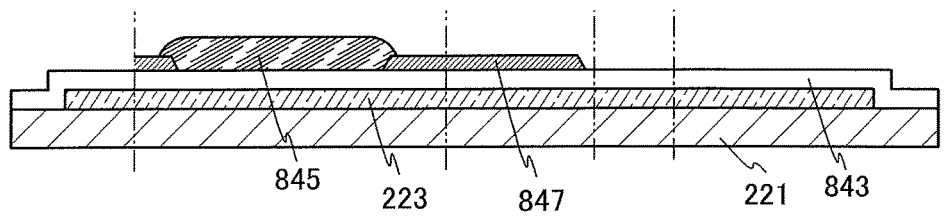

In addition, as illustrated in FIG. 11B, a separation layer 223 is formed over a formation substrate 221, and the insulating layer 843 is formed over the separation layer 223. Then, the light-blocking layer 847 and the coloring layer 845 are formed over the insulating layer 843. Although not shown here, an overcoat overlapping the light-blocking layer 847 and the coloring layer 845 may be provided as illustrated in FIG. 9D. Here, the insulating layer 843, the light-blocking layer 847, and the coloring layer 845 are collectively referred to as a peeled layer.

Next, the formation substrate 201 and the formation substrate 221 are attached to each other with the bonding layer 823, and the bonding layer 823 is cured. Note that the formation substrate 201 and the formation substrate 221 are preferably attached to each other in a reduced-pressure atmosphere.

Figure 11C:
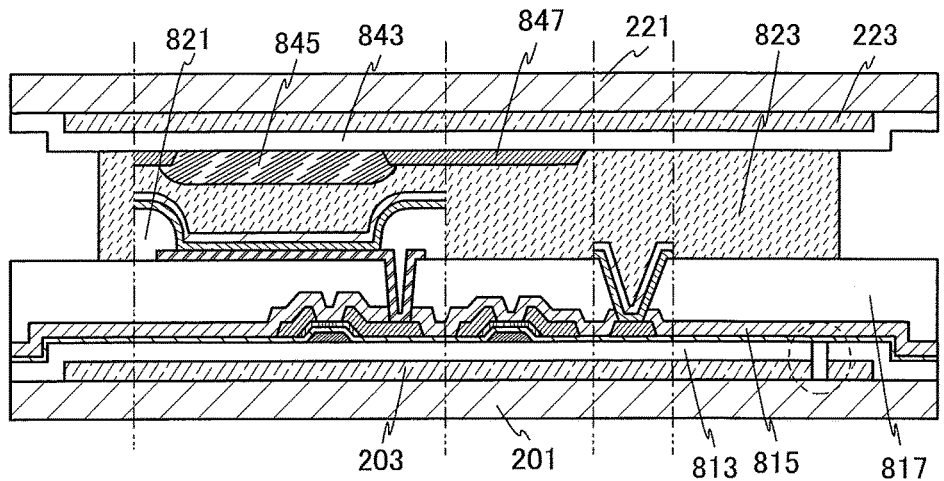

Although FIG. 11C illustrates the case where the separation layer 203 and the separation layer 223 have the same size, separation layers with different sizes may be used.

The bonding layer 823 is positioned to overlap the separation layer 203 and the peeled layers. As illustrated in FIG. 11C, it is preferred that the edge of the bonding layer 823 overlap the separation layer 203. When there is a region where the bonding layer 823 does not overlap the separation layer 203, failure of separation is likely to occur in some cases depending on the area of the region and the degree of adhesion between the bonding layer 823 and a layer in contact therewith. It is therefore preferable that the edge of the bonding layer 823 overlap the separation layer 203 or be aligned with the edge of the separation layer 203.

Although the bonding layer 823 is a sheet-like adhesive in this embodiment, one embodiment of the present invention is not limited to this. Note that a sheet-like adhesive can be provided only in an intended region because of its low fluidity, thereby preventing the bonding layer 823 from extending beyond the separation layer 203 and the yield in the separation process from decreasing. Thus, the yield in the separation process can be increased.

Then, a separation trigger is formed by laser light irradiation (FIG. 11C). Here, an example in which the insulating layer 813 and the separation layer 203 are partly removed is described. Note that in a diagram illustrating the step of forming a separation trigger, a region where the separation trigger is formed is surrounded by a dashed line.

A region where the cured bonding layer 823, the peeled layer, and the separation layer 203 overlap with each other is irradiated with laser light. Although laser light irradiation may be performed from either substrate side at this time, it is preferably performed from the side of the formation substrate 201, where the separation layer 203 is provided, in order to prevent the functional element or the like from being irradiated with scattered light. Note that a material that transmits the laser light is used for the substrate on the side where laser light irradiation is performed.

The separation trigger can be formed in such a manner that part of the first layer (the layer that is included in the peeled layer and is in contact with the separation layer 203) is removed by cracking at least the first layer (causing a break or a crack in at least the first layer). At this time, not only the first layer but also the separation layer 203, the bonding layer 823, or another layer included in the peeled layer may be partly removed. Laser light irradiation enables part of the films included in the peeled layer, the separation layer 203, or the bonding layer 823 to be dissolved, evaporated, or thermally broken.

In this manufacturing method, separation is performed after the formation substrates each provided with the peeled layer are attached to each other in advance, and then, flexible substrates can be attached to the peeled layers. Thus, formation substrates having low flexibility can be attached to each other when the peeled layers are attached to each other, whereby alignment accuracy at the time of attachment can be improved as compared to the case where flexible substrates are attached to each other. Therefore, it can be said that this manufacturing method has high alignment accuracy at the time of attaching a light-emitting element and a color filter.

Figure 12A:
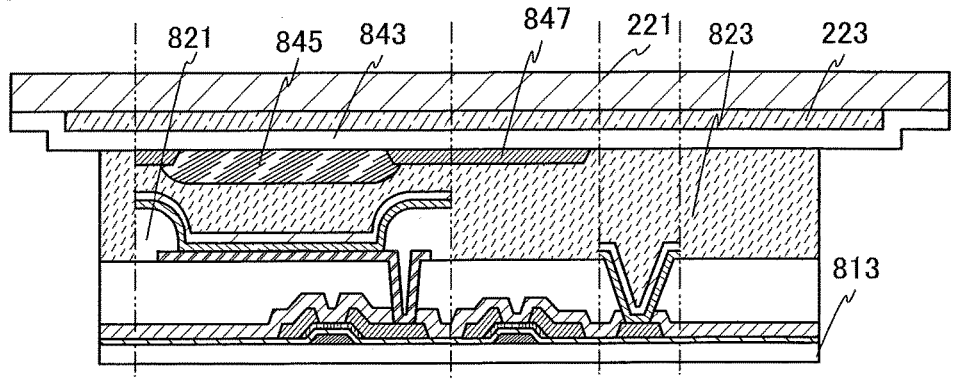
FIGS. 12A to 12C illustrate an example of a method for fabricating a light-emitting device of one embodiment of the present invention.

Next, the peeled layer and the formation substrate 201 are separated from each other from the formed separation trigger. Accordingly, the peeled layer is transferred from the formation substrate 201 to the formation substrate 221 (FIG. 12A).

Either the formation substrate 201 or the formation substrate 221 may be separated first. In the case where the separation layers differ in size, a substrate over which a larger separation layer is formed may be separated first or a substrate over which a smaller separation layer is formed may be separated first. In the case where a semiconductor element, a light-emitting element, a display element, or the like is formed only over one of the substrates, the substrate where the element is formed may be separated first or the other substrate may be separated first. Here, an example in which the formation substrate 201 is separated first is described.

For example, the peeled layer and the formation substrate 201 may be separated by mechanical force (e.g., peeling with a human hand or a gripper, or separation by rotation of a roller) from the separation trigger.

The formation substrate 201 and the peeled layer may be separated by filling the interface between the separation layer 203 and the peeled layer with a liquid such as water. A portion between the separation layer 203 and the peeled layer absorbs a liquid through capillarity action, so that the separation layer 203 can be separated easily. Furthermore, an adverse effect of static electricity caused at separation on the functional element included in the peeled layer (e.g., damage to a semiconductor element from static electricity) can be suppressed.

Next, the insulating layer 813 that is separated from the formation substrate 201 and exposed is attached to the substrate 801 with the bonding layer 811. Although a sheet-like adhesive is used for the bonding layer 811 in this embodiment, one embodiment of the present invention is not limited to this.

Figure 12B:
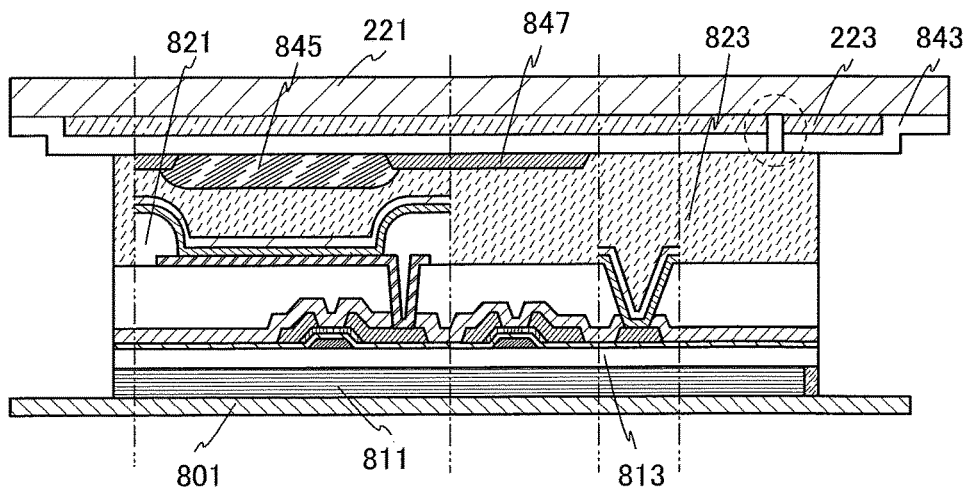
Figure 12C:
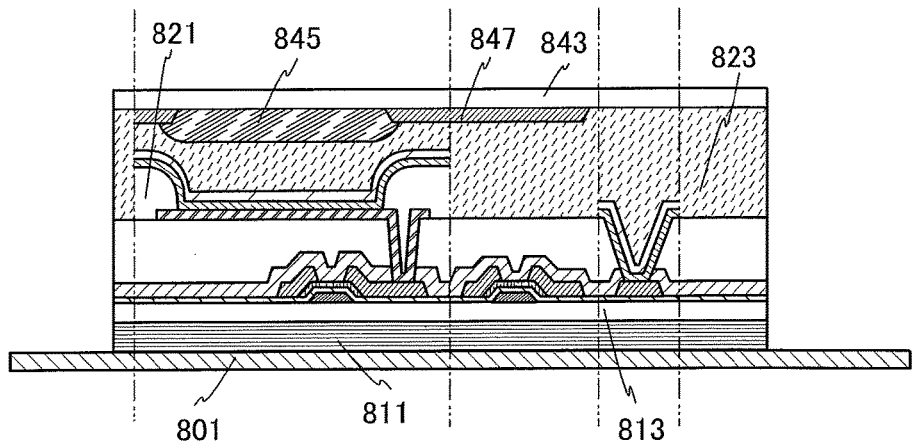

Then, a separation trigger is formed by laser light irradiation (FIG. 12B). Subsequently, the insulating layer 843 and the formation substrate 221 are separated from each other from the formed separation trigger (FIG. 12C).

In the above manner, the peeled layers can be transferred from the formation substrate 201 and the formation substrate 221 to the substrate 801.

Figure 13A:
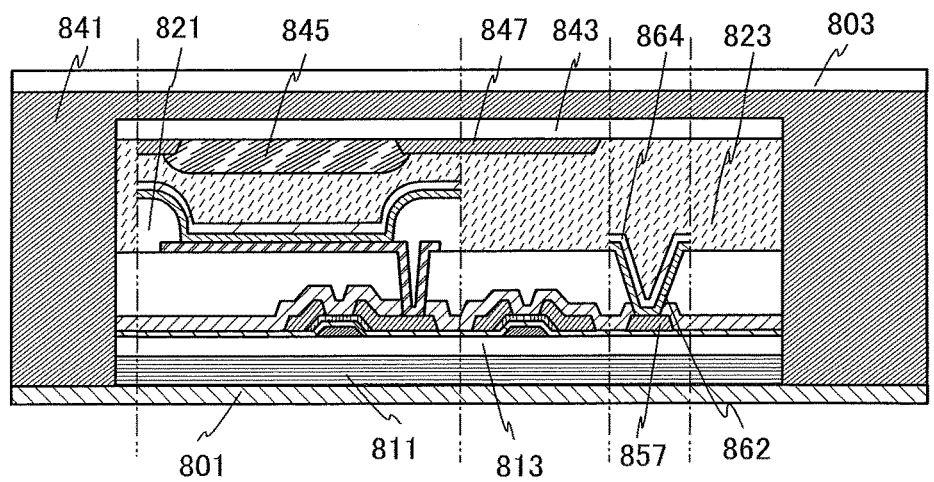
FIGS. 13A and 13B illustrate an example of a method for fabricating a light-emitting device of one embodiment of the present invention.

After that, a step of exposing the conductive layer 857 and a step of attaching the insulating layer 843 and the substrate 803 with the bonding layer 841 are performed. Either step may be performed first. In this embodiment, the insulating layer 843 and the substrate 803 are attached first using the bonding layer 841 (FIG. 13A). Although a sheet-like adhesive is used for the bonding layer 841 here, one embodiment of the present invention is not limited to this.

For example, the conductive layer 857 is exposed by forming an opening in the insulating layer 843 and the bonding layer 823. In the case where the substrate 803 overlaps the conductive layer 857, the opening is formed also in the substrate 803 and the bonding layer 841 so that the conductive layer 857 is exposed.

There is no particular limitation on the method for forming the opening and the method may be laser ablation, etching, or ion beam sputtering, for example. As another method, a slit may be made in a film over the conductive layer 857 with a needle, a sharp knife such as a cutter, or the like and part of the film may be peeled by physical force.

Figure 13B:
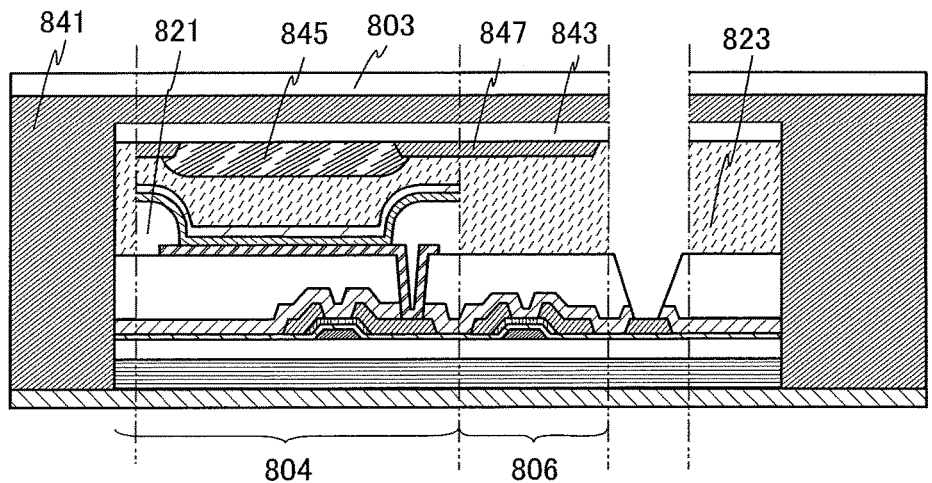

For example, using the removed part of the film as a trigger, the substrate 803, the bonding layer 841, the insulating layer 843, the bonding layer 823, the EL layer 862, and the conductive layer 864 each overlapping the conductive layer 857 are removed (FIG. 13B). For instance, an adhesive roller is pressed to the substrate 803 and the roller is rolled and moved relatively. Alternatively, an adhesive tape may be attached to the substrate 803 and then peeled. Adhesion between the EL layer 862 and the conductive layer 864 and adhesion between layers included in the EL layer 862 are low; thus, separation occurs at the interface between the EL layer 862 and the conductive layer 864 or in the EL layer 862. Accordingly, a region where the substrate 803, the bonding layer 841, the insulating layer 843, the bonding layer 823, the EL layer 862, or the conductive layer 864 overlaps the conductive layer 857 can be removed selectively. Note that when the EL layer 862 or the like remains over the conductive layer 857, it may be removed with an organic solvent or the like.

There is no limitation on a method for removing the layer overlapping the conductive layer 857 as long as the conductive layer 857 can be exposed and electrically connected to the FPC 808 in a subsequent step. The EL layer 862 and the conductive layer 864 do not need to overlap the conductive layer 857 if not necessary. For example, the conductive layer 864 is not necessarily provided when separation occurs in the EL layer 862. Moreover, when the EL layer 862 and the bonding layer 823 are in contact with each other, for example, materials of the two layers might be mixed or the interface between the layers might become unclear depending on the materials. In such a case, the conductive layer 864 is preferably provided between the EL layer 862 and the bonding layer 823 to suppress a reduction of the reliability of the light-emitting device.

Finally, the FPC 808 is attached to each electrode (the conductive layer 857) of an input-output terminal portion with the use of an anisotropic conductive member (the connector 825). An IC chip or the like may be mounted if necessary. Note that when the flexible substrate warps easily, the attachment accuracy might deteriorate at the time of attachment of the FPC or a TCP. Therefore, the manufactured device may be supported by glass, silicone rubber, or the like at the time of attachment of the FPC or the TCP. Thus, the FPC or the TCP can be electrically connected to the functional element with high reliability.

In the method for manufacturing the light-emitting device of one embodiment of the present invention described above, separation is performed after a separation trigger is formed and the interface between the separation layer and the peeled layer is made in a state where separation is easily performed. Accordingly, the yield of the separation process can be increased. As a result, the light-emitting device can be manufactured with a high yield.

This embodiment can be combined with any other embodiment as appropriate.

Embodiment 5

In this embodiment, electronic devices and lighting devices that can be fabricated using the touch panel of one embodiment of the present invention will be described with reference to FIGS. 14A to 14G and FIGS. 15A to 15I.

The touch panel of one embodiment of the present invention is flexible and thus is preferably used in a flexible electronic device and a flexible lighting device. According to one embodiment of the present invention, an electronic device and a lighting device that have high reliability and high resistance to repeated bending can be achieved.

Examples of electronic devices include a television set (also referred to as television or television receiver), a monitor of a computer or the like, a camera such as a digital camera and a digital video camera, a digital photo frame, a mobile phone (also referred to as a cellular phone or mobile phone device), a portable game machine, a portable information appliance, an audio reproducing device, and a large game machine such as a pachinko machine.

The touch panel of one embodiment of the present invention has flexibility and therefore can be incorporated along a curved inside/outside wall surface of a house or a building or a curved interior/exterior surface of a car.

An electronic device or a lighting device of one embodiment of the present invention may include a touch panel and a secondary battery. In that case, it is preferred that the secondary battery be capable of being charged by non-contact power transmission.

Examples of the secondary battery include a lithium ion secondary battery such as a lithium polymer battery using a gel electrolyte (lithium ion polymer battery), a nickel-hydride battery, a nickel-cadmium battery, an organic radical battery, a lead-acid battery, an air secondary battery, a nickel-zinc battery, and a silver-zinc battery.

An electronic device or a lighting device of one embodiment of the present invention may include a touch panel and an antenna. Receiving a signal with the antenna enables a display portion to display video, information, and the like. When the touch panel includes a secondary battery, the antenna may be used for non-contact power transmission.

Figure 14A:
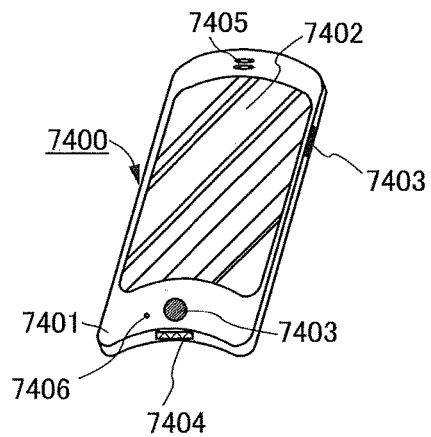
FIGS. 14A to 14G each illustrate an example of an electronic device or a lighting device of one embodiment of the present invention.

FIG. 14A illustrates an example of a mobile phone. A mobile phone 7400 is provided with a display portion 7402 incorporated in a housing 7401, an operation button 7403, an external connection port 7404, a speaker 7405, a microphone 7406, and the like. The mobile phone 7400 is manufactured using the touch panel of one embodiment of the present invention for the display portion 7402. According to one embodiment of the present invention, a highly reliable mobile phone having a curved display portion can be provided.

When the display portion 7402 of the mobile phone 7400 in FIG. 14A is touched with a finger or the like, data can be input to the mobile phone 7400. Operations such as making a call and inputting letters can be performed by touch on the display portion 7402 with a finger or the like.

With the operation button 7403, the power can be turned on and off. Furthermore, types of images displayed on the display portion 7402 can be switched; for example, the image can be switched from a mail creation screen to a main menu.

Figure 14B:
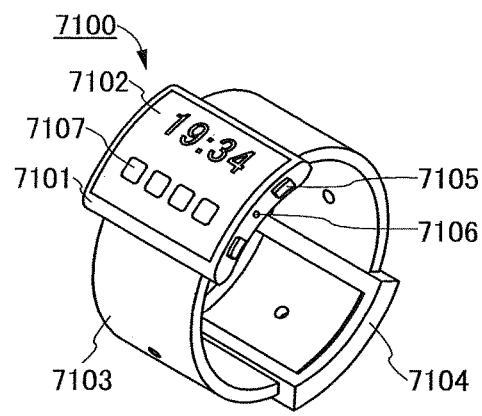

FIG. 14B illustrates an example of a wrist-watch-type portable information appliance A portable information appliance 7100 includes a housing 7101, a display portion 7102, a band 7103, a buckle 7104, an operation button 7105, an input/output terminal 7106, and the like.

The portable information appliance 7100 is capable of executing a variety of applications such as mobile phone calls, e-mailing, reading and editing texts, music reproduction, Internet communication, and a computer game.

The display surface of the display portion 7102 is curved, and images can be displayed on the curved display surface. The display portion 7102 includes a touch sensor, and operation can be performed by touching the screen with a finger, a stylus, or the like. For example, an application can be started by touching an icon 7107 displayed on the display portion 7102.

With the operation button 7105, a variety of functions such as time setting, power on/off, on/off control of wireless communication, setting and cancellation of manner mode, and setting and cancellation of power saving mode can be performed. For example, the functions of the operation button 7105 can be set freely by the operating system incorporated in the portable information appliance 7100.

The portable information appliance 7100 can employ near field communication, which is a communication method based on an existing communication standard. In that case, for example, hands-free calling is achieved with mutual communication between the portable information appliance 7100 and a headset capable of wireless communication.

Since the portable information appliance 7100 includes the input/output terminal 7106, data can be directly transmitted to and received from another information appliance via a connector. Charging through the input/output terminal 7106 is possible. Note that the charging operation may be performed by wireless power feeding without using the input/output terminal 7106.

The display portion 7102 of the portable information appliance 7100 includes the touch panel of one embodiment of the present invention. According to one embodiment of the present invention, a highly reliable portable information appliance having a curved display portion can be provided.

Figure 14C:
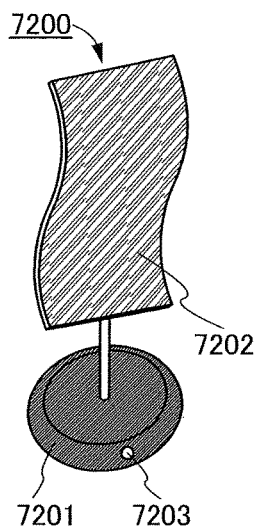
Figure 14D:
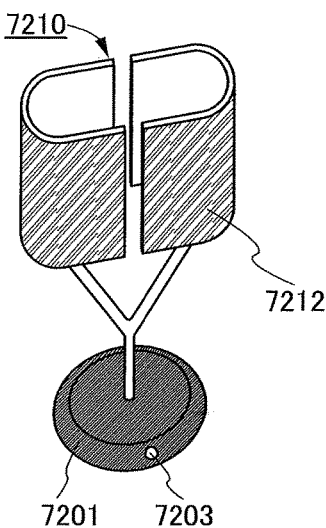
Figure 14E:
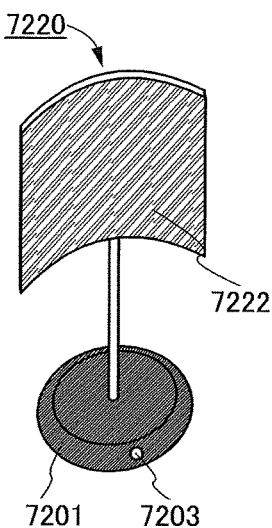

FIGS. 14C to 14E illustrate examples of lighting devices. Lighting devices 7200, 7210, and 7220 each include a stage 7201 provided with an operation switch 7203 and a light-emitting portion supported by the stage 7201.

The lighting device 7200 illustrated in FIG. 14C includes a light-emitting portion 7202 with a wave-shaped light-emitting surface and thus has a sophisticated design.

A light-emitting portion 7212 included in the lighting device 7210 in FIG. 14D has two convex-curved light-emitting portions symmetrically placed. Thus, all directions can be illuminated with the lighting device 7210 as a center.

The lighting device 7220 illustrated in FIG. 14E includes a concave-curved light-emitting portion 7222. This is suitable for illuminating a specific range because light emitted from the light-emitting portion 7222 is collected at the front of the lighting device 7220.

The light-emitting portion included in each of the lighting devices 7200, 7210, and 7220 is flexible; accordingly, the light-emitting portion may be fixed on a plastic member, a movable frame, or the like so that a light-emitting surface of the light-emitting portion can be bent freely depending on the intended use.

Although the lighting devices in which the light-emitting portion is supported by the stage are described as examples, a housing provided with a light-emitting portion can be fixed on a ceiling or suspended from a ceiling. Since the light-emitting surface can be curved, the light-emitting surface can be bent concavely so that a particular region is brightly illuminated, or bent convexly so that the whole room is brightly illuminated.

Here, each of the light-emitting portions includes the touch panel of one embodiment of the present invention. According to one embodiment of the present invention, a highly reliable lighting device having a curved light-emitting portion can be provided.

Figure 14F:
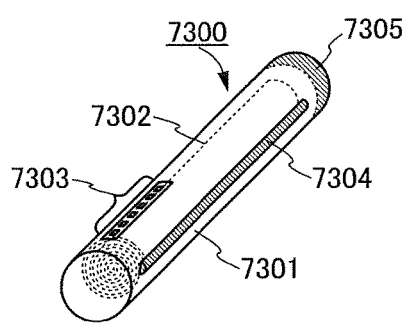

FIG. 14F illustrates an example of a portable touch panel. A touch panel 7300 includes a housing 7301, a display portion 7302, operation buttons 7303, a display portion pull 7304, and a control portion 7305.

The touch panel 7300 includes a rolled flexible display portion 7302 in the cylindrical housing 7301.

The touch panel 7300 can receive a video signal with the control portion 7305 and can display the received video on the display portion 7302. The control portion 7305 includes a battery. Moreover, the control portion 7305 may include a terminal portion for connecting a connector so that a video signal or power can be directly supplied from the outside through a wire.

By pressing the operation buttons 7303, power on/off, switching of displayed video, and the like can be performed.

Figure 14G:
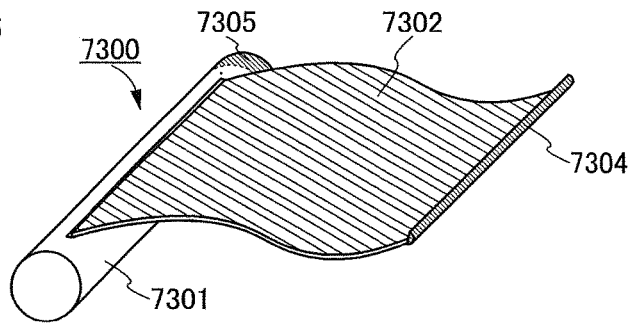

FIG. 14G illustrates the touch panel 7300 in a state where the display portion 7302 is pulled out with the display portion pull 7304. Video can be displayed on the display portion 7302 in this state. The operation buttons 7303 on the surface of the housing 7301 allow one-handed operation. The operation buttons 7303 are provided not in the center of the housing 7301 but on one side of the housing 7301 as illustrated in FIG. 14F, which makes one-handed operation easy.

A reinforcement frame may be provided for a side portion of the display portion 7302 so that the display portion 7302 has a flat display surface when pulled out.

Note that in addition to this structure, a speaker may be provided for the housing so that sound is output with an audio signal received together with a video signal.

The display portion 7302 includes the touch panel of one embodiment of the present invention. According to one embodiment of the present invention, a lightweight and highly reliable touch panel can be provided.

Figure 15A:
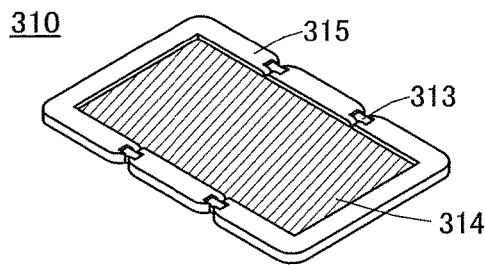
FIGS. 15A to 15I illustrate examples of an electronic device of one embodiment of the present invention.
Figure 15B:
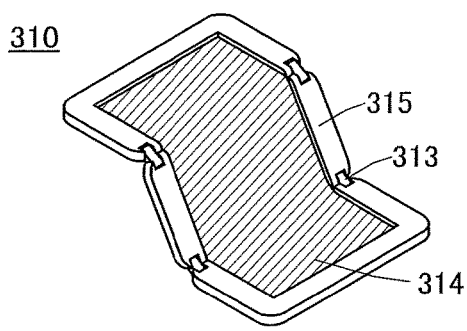
Figure 15C:
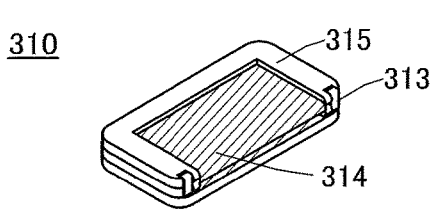

FIGS. 15A to 15C illustrate a foldable portable information appliance 310. FIG. 15A illustrates the portable information appliance 310 that is opened. FIG. 15B illustrates the portable information appliance 310 that is being opened or being folded. FIG. 15C illustrates the portable information appliance 310 that is folded. The portable information appliance 310 is highly portable when folded, and is highly browsable when opened because of a seamless large display region.

A touch panel 314 is supported by three housings 315 joined together by hinges 313. By folding the portable information appliance 310 at a connection portion between two housings 315 with the hinges 313, the portable information appliance 310 can be reversibly changed in shape from an opened state to a folded state. The touch panel in one embodiment of the present invention can be used as the touch panel 314. For example, it is possible to use a touch panel that can be bent with a radius of curvature of 1 mm or more and 150 mm or less.

In one embodiment of the present invention, a sensor that senses whether the touch panel is folded or opened and supplies sensing information may be provided. When obtaining information indicating that the touch panel is folded, a control unit of the touch panel may stop a folded portion (or a portion that is folded and cannot be seen by a user) from operating, specifically performing display or sensing by a touch sensor.

Similarly, the control unit of the touch panel may make display and sensing by a touch sensor restart when obtaining information indicating that the touch panel is opened.

Figure 15D:
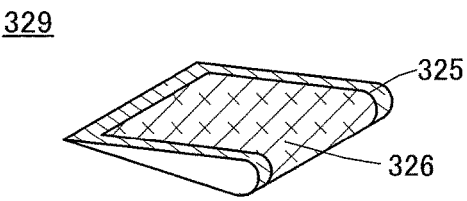
Figure 15E:
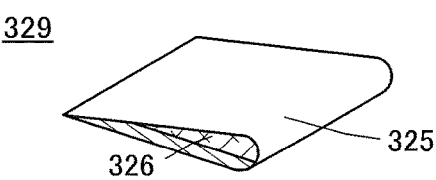

FIGS. 15D and 15E illustrate a foldable portable information appliance 329. FIG. 15D illustrates the portable information appliance 329 that is folded so that a display portion 326 is on the outside. FIG. 15E is the portable information appliance 329 that is folded so that the display portion 326 is on the inside. When the portable information appliance 329 is not used, the portable information appliance 329 is folded so that a non-display portion 325 faces the outside, whereby the display portion 326 can be prevented from being contaminated or damaged. The touch panel in one embodiment of the present invention can be used for the display portion 326.

Figure 15F:
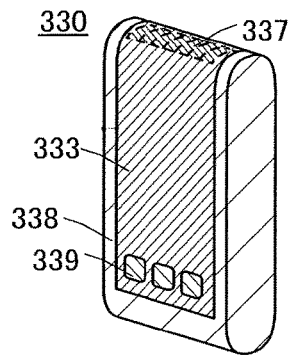
Figure 15G:
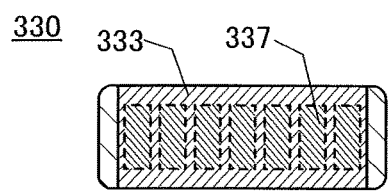
Figure 15H:
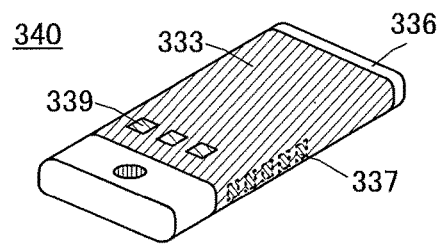

FIG. 15F is a perspective view illustrating the external shape of a portable information appliance 330. FIG. 15G is a top view of the portable information appliance 330. FIG. 15H is a perspective view illustrating the external shape of a portable information appliance 340.

The portable information appliances 330 and 340 function as one or more of a telephone set, an electronic notebook, and an information browsing system, for example. Specifically, each of the portable information appliances 330 and 340 can be used as a smartphone.

The portable information appliances 330 and 340 can display letters and image data on their plurality of surfaces. For example, three operation buttons 339 can be displayed on one surface (FIGS. 15F and 15H). Furthermore, information 337 indicated by dashed rectangles can be displayed on another surface (FIGS. 15G and 15H). Examples of the information 337 include notification of a social networking service (SNS) message, display indicating reception of an email or an incoming call, the title or sender of an email or the like, the date, the time, remaining battery, and the reception strength of an antenna. Alternatively, the operation button 339, an icon, or the like may be displayed in place of the information 337. Although FIGS. 15F and 15G show the example in which the information 337 is displayed at the top, one embodiment of the present invention is not limited to this example. For instance, the information 337 may be displayed on the side as in the portable information appliance 340 in FIG. 15H.

For example, a user can see the display (here, the information 337) with the portable information appliance 330 put in a breast pocket.

Specifically, a caller's phone number, name, or the like of an incoming call is displayed at a position that can be observed from above the portable information appliance 330. Thus, the user can see the display without taking out the portable information appliance 330 from the pocket and decide whether to answer the phone.

The touch panel of one embodiment of the present invention can be used for a display portion 333 included in a housing 338 of the portable information appliance 330 and a housing 336 of the portable information appliance 340. According to one embodiment of the present invention, a highly reliable portable information appliance having a curved display portion can be provided.

Figure 15I:
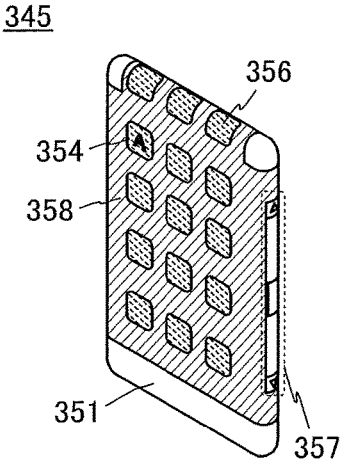

As in a portable information appliance 345 illustrated in FIG. 15I, information may be displayed on at least three surfaces. Here, as an example, information 354, information 356, and information 357 are displayed on different surfaces.

The touch panel of one embodiment of the present invention can be used for a display portion 358 included in a housing 351 of the portable information appliance 345. According to one embodiment of the present invention, a highly reliable portable information appliance having a curved display portion can be provided.

This embodiment can be combined with any other embodiment as appropriate.

Example

This example will show results of bending tests of a fabricated touch panel in one embodiment of the present invention. The touch panel fabricated in this example includes a top-emission display panel using a color filter method and a capacitive touch sensor as illustrated in FIG. 19A.

<Method for Fabricating Sample>

First, a flexible display panel and a flexible touch sensor were each fabricated in such a manner that elements were formed over a glass substrate serving as a formation substrate, separated from the formation substrate, and transferred to a flexible substrate. As a separation layer, a stacked layer of a tungsten film and a tungsten oxide film thereover was formed. Embodiments 2 and 3 can be referred to for the details of the fabrication method.

The display panel includes an organic EL element as a display element, and a transistor using a c-axis aligned crystalline oxide semiconductor (CAAC-OS).

Since the CAAC-OS, which is not amorphous, has few defect states, using the CAAC-OS improves the reliability of the transistor. Moreover, since the CAAC-OS does not have a grain boundary, stress that is caused by bending a flexible device does not easily make a crack in a CAAC-OS film.

A CAAC-OS is a crystalline oxide semiconductor in which c-axes of crystals are oriented in a direction substantially perpendicular to a film surface. It has been found that oxide semiconductors have a variety of crystal structures other than a single crystal structure, for example, a nanocrystal (nc) structure, which is an aggregate of nanoscale microcrystals. The crystallinity of the CAAC-OS is lower than that of a single crystal oxide semiconductor and higher than that of an nc-OS.

In this example, a channel-etched transistor using an In—Ga—Zn-based oxide was used. The transistor was fabricated over a glass substrate at a process temperature lower than 500° C.

In a method of fabricating an element such as a transistor directly over an organic resin such as a plastic substrate, the temperature of the process for fabricating the element needs to be lower than the upper temperature limit of the organic resin. In this example, the formation substrate is a glass substrate and the separation layer, which is an inorganic film, has high heat resistance; thus, the transistor can be fabricated at a temperature equivalent to that when a transistor is fabricated over a glass substrate, and the performance and reliability of the transistor can be easily secured.

As the organic EL element, a tandem organic EL element that included a fluorescent unit including a blue light-emitting layer and a phosphorescent unit including a green light-emitting layer and a red light-emitting layer was used. The organic EL element was a top-emission organic EL element and included an ITO film functioning as an optical adjustment layer. The thickness of the optical adjustment layer was varied depending on the color of pixels. Owing to the combination of a color filter and a microcavity structure, light with high color purity can be extracted from the display panel fabricated in this example.

The display panel and the touch sensor each include a pair of flexible substrates 16. A 20-μm-thick organic resin film was used as the flexible substrates 16.

Next, UV ozone treatment was performed on surfaces of the display panel and the touch sensor that were to be attached to each other.

Subsequently, by using a laminator, a 300-μm-thick bonding layer was formed over the surface of the touch sensor that was to be attached to the display panel. For a sample, a silicone-based gel adhesive layer was used. For a comparative sample, an acrylic-based gel adhesive layer was used.

The properties of the silicone-based gel adhesive layer used for the sample were as follows: a Young's modulus of 50 kPa, a penetration of 100, a transmittance of 91%, and a compression set of 32%. The properties of the acrylic-based gel adhesive layer used for the comparative sample were as follows: a Young's modulus of approximately 300 kPa and a penetration of 75.

Then, the display panel and the touch sensor were attached to each other with the bonding layer by using a laminator. After that, heat treatment was performed at 60° C. for 100 hours to increase the adhesion between each substrate and the bonding layer.

Two samples were fabricated; one for evaluating the operation and the other for bending tests. Meanwhile, one comparative sample was fabricated; after its operation was evaluated, the comparative sample was subjected to bending tests.

The operations of the sample and the comparative sample were evaluated, and it was found that in both the sample and the comparative sample, sensing by the touch sensor was possible while the display panel performed display.

Note that in the case where a display panel and a touch sensor similar to those used in the sample and the comparative sample overlapped directly, sensing by the touch sensor was not normally performed while the display panel performed display. Next, the operation was evaluated in the case where a display panel and a touch sensor overlapped each other with a stack provided therebetween to increase the distance between the display panel and the touch sensor. In the stack, a 25-μm-thick silicone resin film and a 50-μm-thick PET film were alternately stacked. When the distance between the display panel and the touch sensor was 100 μm or 175 μm, normal sensing by the touch sensor was not performed while the display panel performed display. When the distance is 250 μm, normal sensing was performed; however, it was difficult to repeatedly bend the touch panel using a 250-μm-thick stack.

Figure 16:
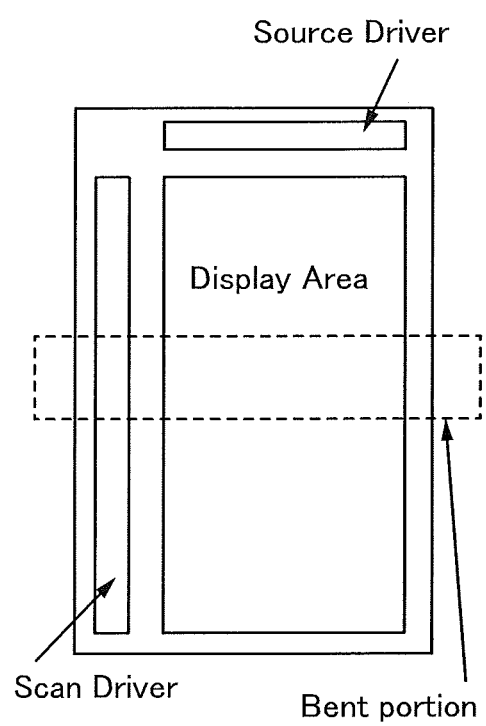
FIG. 16 illustrates a light-emitting device fabricated in Example.

In addition, the sample and the comparative sample were subjected to bending tests. As illustrated in FIG. 16, a bent portion is a middle portion of the touch panel and includes a display area and a scan driver. The bending tests were performed using a book-type bending tester shown in FIGS. 17A and 17B.

Figure 17A:
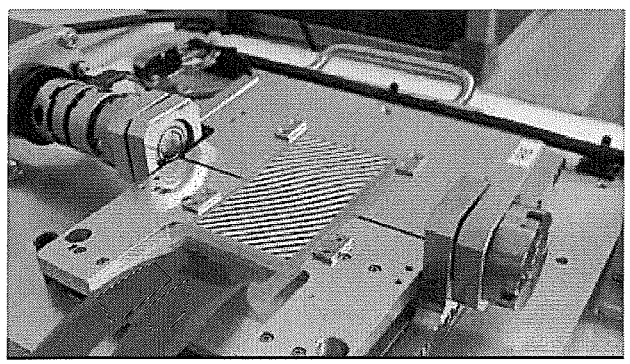
FIGS. 17A and 17B are photographs of a bending tester in Example.
Figure 17B:
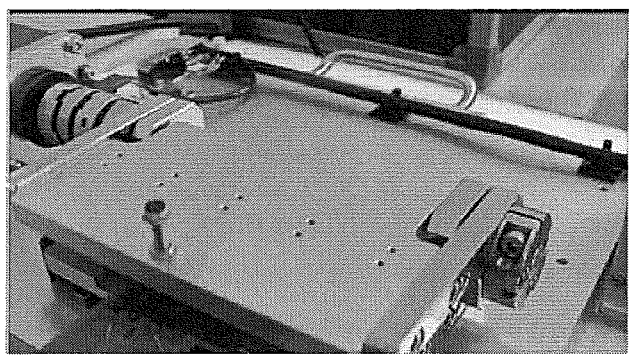

In the bending tests, the bending tester is repeatedly opened (FIG. 17A) and closed (FIG. 17B) like a book. The radius of curvature for bending the touch panel was determined by setting the distance between plates when bent. Note that the panel shown in FIGS. 17A and 17B is not the sample in this example.

The bending characteristics of the touch panel of the sample examined with the book-type bending tester are shown. When inward bending with a radius of curvature of 5 mm was performed 70000 times, no defect occurred in the display area. Moreover, warpage due to bending was hardly observed after the bending tests. Note that here, inward bending means bending performed such that a display surface of the touch panel faces inward.

FIG. 18C shows the sample before the bending tests. FIG. 18D shows the sample after being bent 16500 times. Note that the state of the sample after being bent 70000 times was hardly different from that shown in FIG. 18D.

Here, attention was focused on the positional relation between the color filter 98 provided on the display panel side and the electrode 99 provided on the touch sensor side. It was found that the distance between the color filter 98 and the electrode 99 was wider in the state in FIG. 18B where the sample was bent than in the state in FIG. 18A where the sample was not bent. It can be thus said that the bonding layer 12 is changed in shape from the state in FIG. 1A to the state in FIG. 1B as shown in Embodiment 1.

Meanwhile, when the comparative sample was bent inward with a radius of curvature of 5 mm, one inward bending caused warpage at a bent portion (see an area enclosed by a dashed line in FIG. 18E).

As described above, in this example, a highly reliable flexible touch panel with high resistance to repeated bending was fabricated by attaching a display panel and a touch sensor with the use of a bonding layer with a Young's modulus of 50 kPa. Furthermore, both thinness and high detection sensitivity of the touch panel were achieved.

This example suggests that a touch panel that achieves both thinness and high detection sensitivity and is highly resistant to repeated bending can be fabricated by using a bonding layer with a Young's modulus of less than 300 kPa, preferably 50 kPa or less to attach a display panel and a touch sensor.

This application is based on Japanese Patent Application serial no. 2014-050670 filed with Japan Patent Office on Mar. 13, 2014, the entire contents of which are hereby incorporated by reference.

What is claimed is:
1. A flexible touch panel comprising:
a display panel;
a touch sensor; and
a bonding layer,
wherein the display panel and the touch sensor are flexible, wherein the bonding layer is between the display panel and the touch sensor,
wherein the bonding layer has a Young's modulus greater than or equal to 1 kPa and less than or equal to 50 kPa, and
wherein the bonding layer has a thickness greater than or equal to 0.1 mm and less than or equal to 1 mm.

2. The flexible touch panel according to claim 1, wherein the touch sensor is a capacitive touch sensor.

3. The flexible touch panel according to claim 1, wherein the display panel comprises an organic EL element.

4. The flexible touch panel according to claim 1, wherein the bonding layer has a compression set of 50% or less.

5. The flexible touch panel according to claim 4, wherein the bonding layer has a penetration greater than 75.

6. The flexible touch panel according to claim 1, wherein the bonding layer is a gel.

7. The flexible touch panel according to claim 1, wherein the bonding layer has a transmittance of 90% or more.

8. A flexible touch panel comprising:
a display panel comprising:
    a pixel portion comprising a first transistor over a flexible substrate; and
    a driver portion comprising a second transistor over the flexible substrate;
a touch sensor; and
a bonding layer,
wherein the display panel and the touch sensor are flexible,
wherein the bonding layer is between the display panel and the touch sensor,
wherein the bonding layer has a Young's modulus greater than or equal to 1 kPa and less than or equal to 50 kPa,
wherein the bonding layer has a thickness greater than or equal to 0.1 mm and less than or equal to 1 mm,
wherein the touch sensor is a capacitive touch sensor, and
wherein the display panel comprises an organic EL element.

9. The flexible touch panel according to claim 8, wherein the bonding layer has a compression set of 50% or less.

10. The flexible touch panel according to claim 9, wherein the bonding layer has a penetration greater than 75.

11. The flexible touch panel according to claim 8, wherein the bonding layer is a gel.

12. The flexible touch panel according to claim 8, wherein the bonding layer has a transmittance of 90% or more.

13. The flexible touch panel according to claim 8, wherein the first transistor and the second transistor comprise an oxide semiconductor.

14. A flexible touch panel comprising:
a display panel comprising a first transistor;
a touch sensor comprising a second transistor and a capacitor; and
a bonding layer,
wherein the display panel and the touch sensor are flexible,
wherein the bonding layer is between the display panel and the touch sensor,
wherein the bonding layer has a Young's modulus greater than or equal to 1 kPa and less than or equal to 50 kPa, and
wherein the bonding layer has a thickness greater than or equal to 0.1 mm and less than or equal to 1 mm.

15. The flexible touch panel according to claim 14, wherein the touch sensor is a capacitive touch sensor.

16. The flexible touch panel according to claim 14, wherein the display panel comprises an organic EL element.

17. The flexible touch panel according to claim 14, wherein the bonding layer has a compression set of 50% or less.

18. The flexible touch panel according to claim 17, wherein the bonding layer has a penetration greater than 75.

19. The flexible touch panel according to claim 14, wherein the bonding layer is a gel.

20. The flexible touch panel according to claim 14, wherein the bonding layer has a transmittance of 90% or more.

21. The flexible touch panel according to claim 14, wherein the first transistor and the second transistor comprise an oxide semiconductor.

* * * * *